US009083166B2

(12) United States Patent
Gagne et al.

(10) Patent No.: US 9,083,166 B2
(45) Date of Patent: Jul. 14, 2015

(54) BRACKET AND SLEEVE ASSEMBLY

(71) Applicant: Brainwave Research Corporation, Woodbridge (CA)

(72) Inventors: Jean-Guy Gagne, Etobicoke (CA); James W. Rogers, Toronto (CA)

(73) Assignee: BRAINWAVE RESEARCH CORPORATION, Woodbridge (CA)

( * ) Notice: Subject to any disclaimer, the term of this patent is extended or adjusted under 35 U.S.C. 154(b) by 0 days.

(21) Appl. No.: 14/033,257

(22) Filed: Sep. 20, 2013

(65) Prior Publication Data

US 2014/0083759 A1    Mar. 27, 2014

Related U.S. Application Data

(63) Continuation-in-part of application No. 13/795,538, filed on Mar. 12, 2013.

(60) Provisional application No. 61/704,153, filed on Sep. 21, 2012.

(51) Int. Cl.
*H02G 3/08* (2006.01)
*H02G 3/12* (2006.01)
*H02G 3/14* (2006.01)

(52) U.S. Cl.
CPC .............. *H02G 3/12* (2013.01); *H02G 3/086* (2013.01); *H02G 3/126* (2013.01); *H02G 3/14* (2013.01)

(58) Field of Classification Search
CPC ........... H02G 3/08; H02G 3/14; H02G 3/081; H02G 3/086; H02G 3/10; H02G 3/12; H02G 3/121; H02G 3/123; H02G 3/126; H02G 3/185; H01H 9/02; H01H 9/0207

USPC ........ 174/480, 481, 50, 53, 57, 58, 559, 482, 174/490, 503, 502; 220/3.2–3.9, 4.02; 248/343, 906, 205.1

See application file for complete search history.

(56) References Cited

U.S. PATENT DOCUMENTS

| | | | | |
|---|---|---|---|---|
| 2,297,862 | A | * | 10/1942 | Bachmann .................... 220/3.3 |
| 4,964,525 | A | * | 10/1990 | Coffey et al. ................. 248/906 |
| 5,263,676 | A | * | 11/1993 | Medlin et al. ................. 248/906 |
| 5,571,993 | A | * | 11/1996 | Jones et al. .................... 174/57 |

(Continued)

FOREIGN PATENT DOCUMENTS

| | | |
|---|---|---|
| CA | 2 614 101 A1 | 2/2009 |
| WO | 2012/151664 A1 | 11/2012 |

OTHER PUBLICATIONS

International Search Report for corresponding International Patent Application No. PCT/CA2013/000790 mailed Nov. 20, 2013, 3 pages.

(Continued)

*Primary Examiner* — Angel R Estrada
(74) *Attorney, Agent, or Firm* — Ditthavong & Steiner, P.C.

(57) ABSTRACT

An assembly includes a bracket mountable directly to a wall. An inner periphery of the bracket defines an opening in the wall substrate. A removable sleeve is engageable with the bracket and the wall substrate to secure tight contact between the wall substrate and a device interior of the wall, irrespective of the thickness of the wall substrate. A resilient element, cantilevered from an outer side surface of the sleeve, is retained by a barbed element at the inner periphery of the bracket.

6 Claims, 54 Drawing Sheets

(56) References Cited

U.S. PATENT DOCUMENTS

| | | | |
|---|---|---|---|
| 6,369,322 B1* | 4/2002 | Gretz | 174/50 |
| 7,087,837 B1* | 8/2006 | Gretz | 174/58 |
| 7,439,443 B2* | 10/2008 | Dinh | 174/58 |
| 7,838,769 B2* | 11/2010 | Peck | 174/58 |
| 7,902,457 B2* | 3/2011 | Johnson | 174/57 |
| 8,013,243 B2* | 9/2011 | Korcz et al. | 174/481 |
| 8,575,497 B2* | 11/2013 | Hultgreen | 248/906 |
| 8,658,894 B1* | 2/2014 | Witherbee | 174/58 |
| 2003/0014939 A1* | 1/2003 | DeWall | 174/53 |
| 2005/0067180 A1 | 3/2005 | Dinh | |
| 2009/0057303 A1* | 3/2009 | Oddsen et al. | 220/3.5 |
| 2010/0084155 A1* | 4/2010 | Jafari | 174/58 |
| 2010/0252552 A1 | 10/2010 | Nikayin et al. | |
| 2012/0279746 A1* | 11/2012 | Gagne et al. | 174/50.51 |

OTHER PUBLICATIONS

International Written Opinion for corresponding International Patent Application No. PCT/CA2013/000790 mailed Nov. 20, 2013, 6 pages.

* cited by examiner

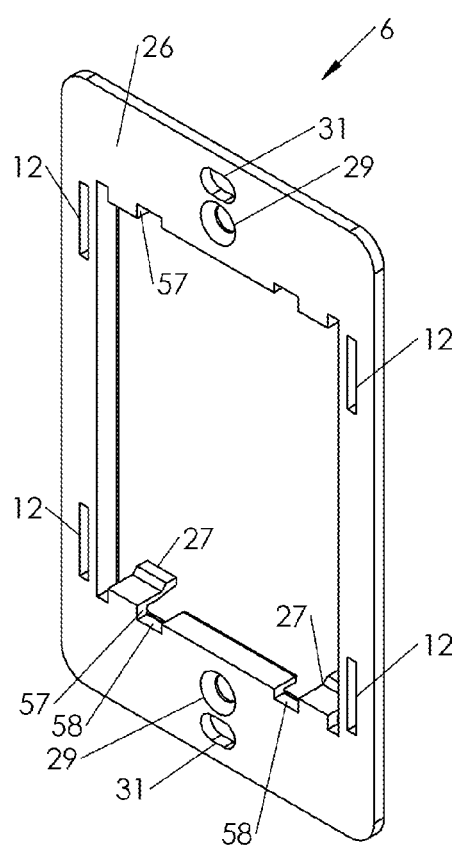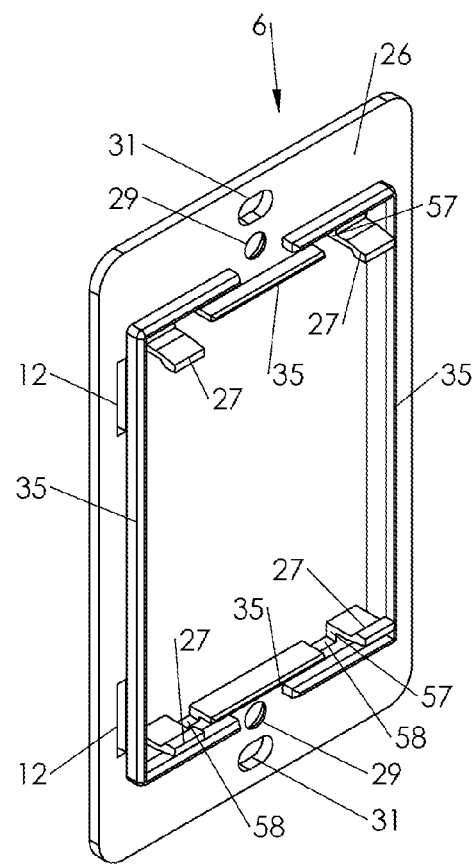
FIG. 3a
FIG. 3b

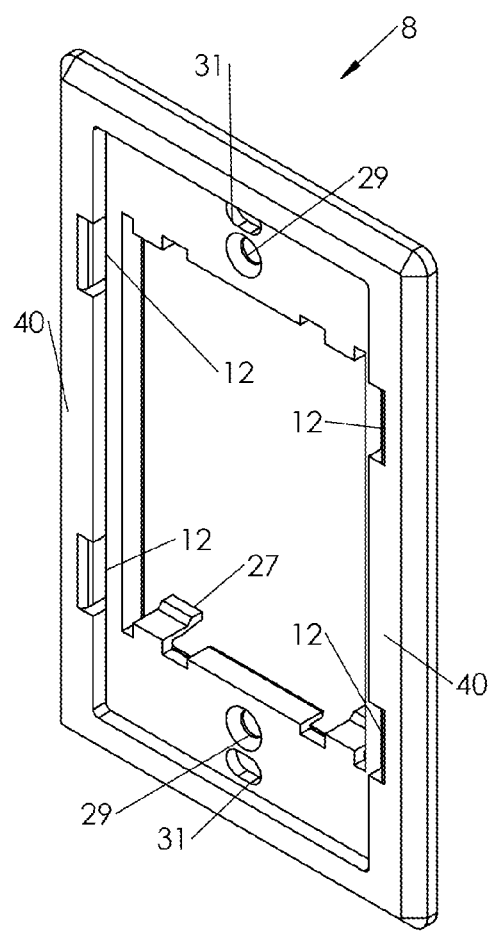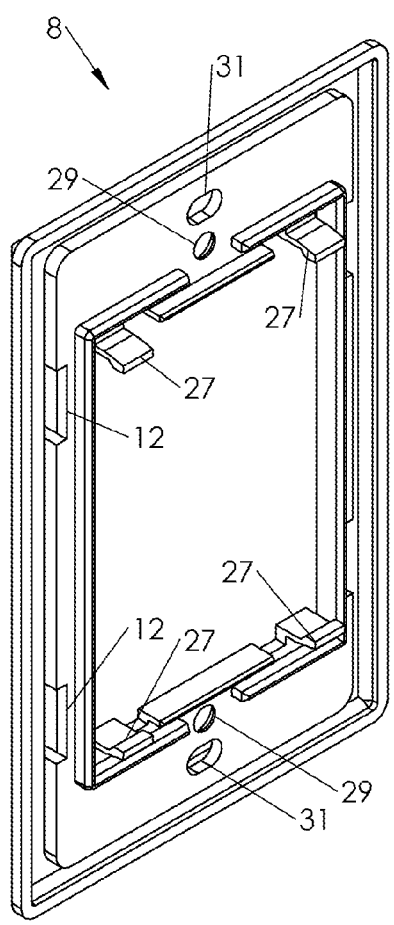
FIG. 10c
FIG. 10d

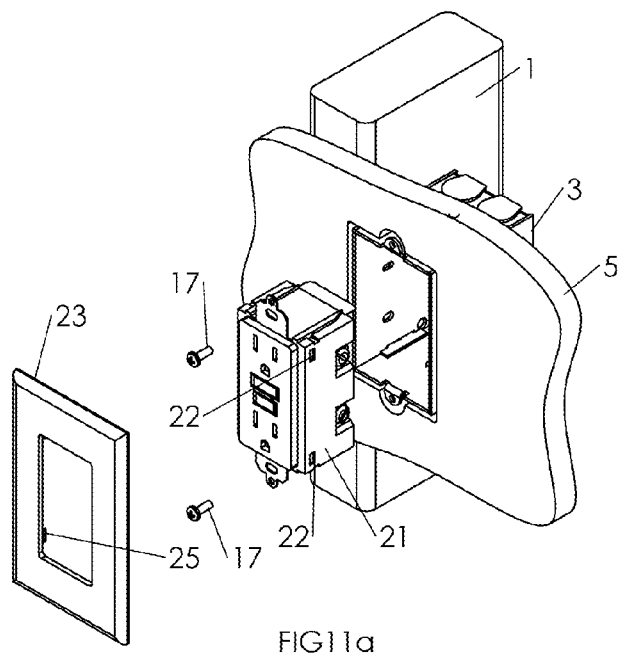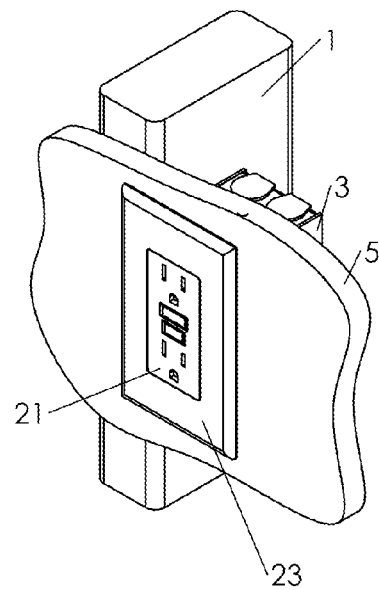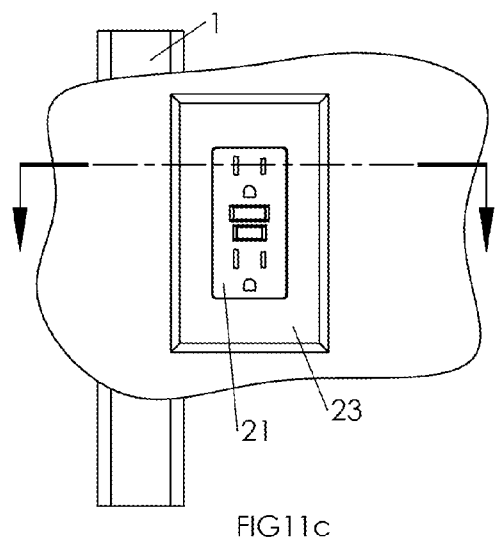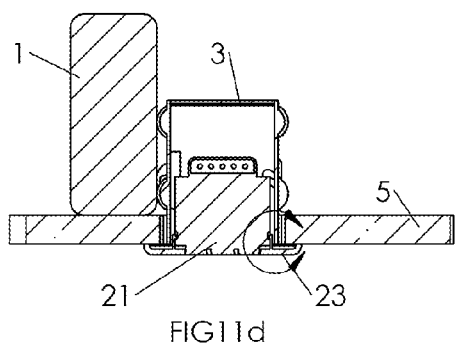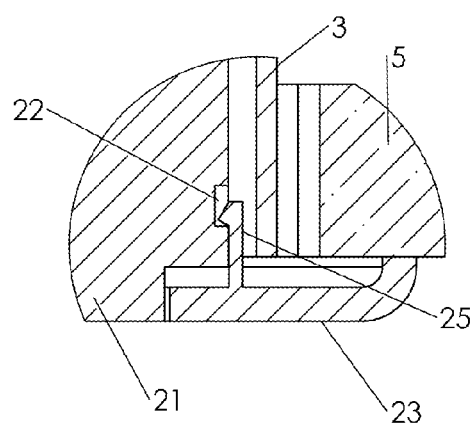

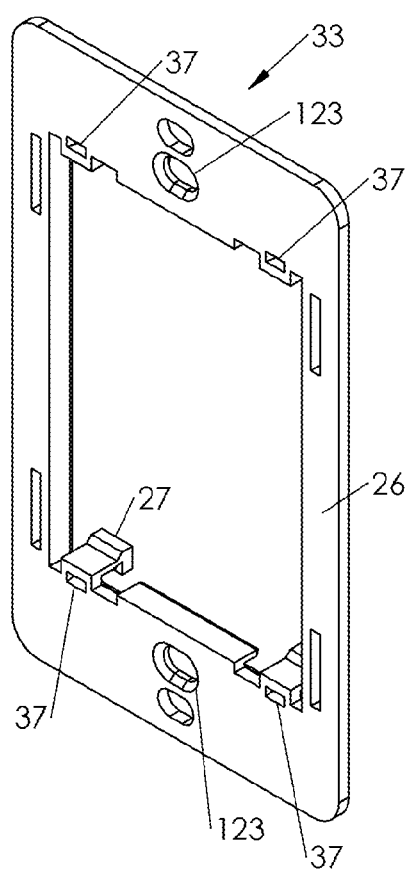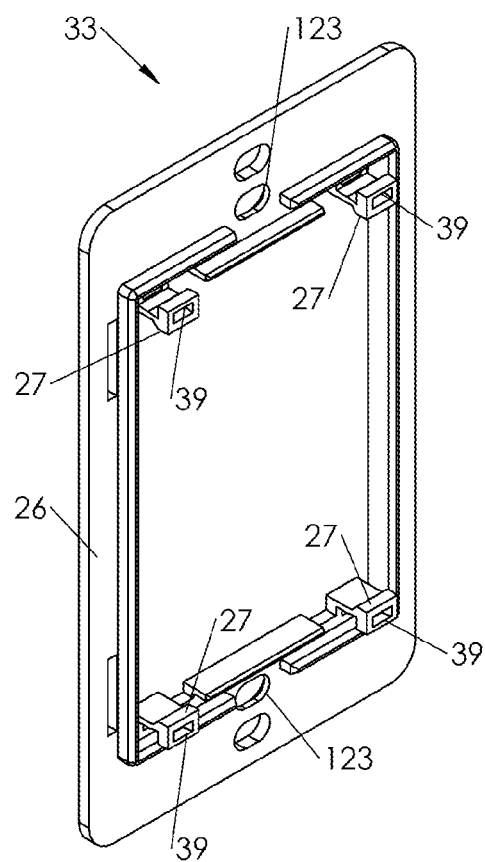
FIG. 19a
FIG. 19b

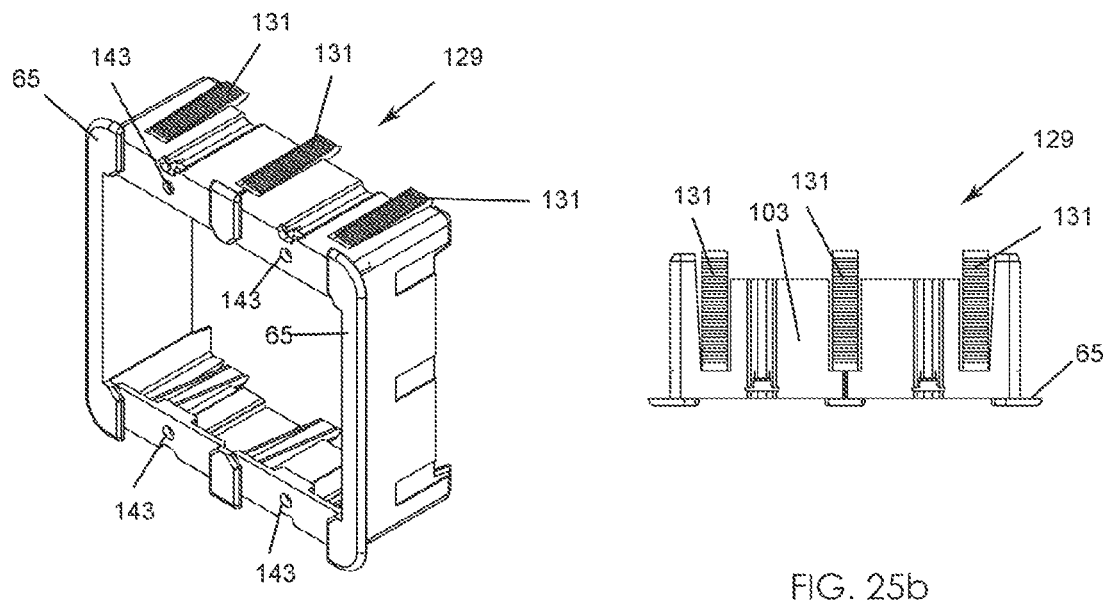
FIG. 25a
FIG. 25b
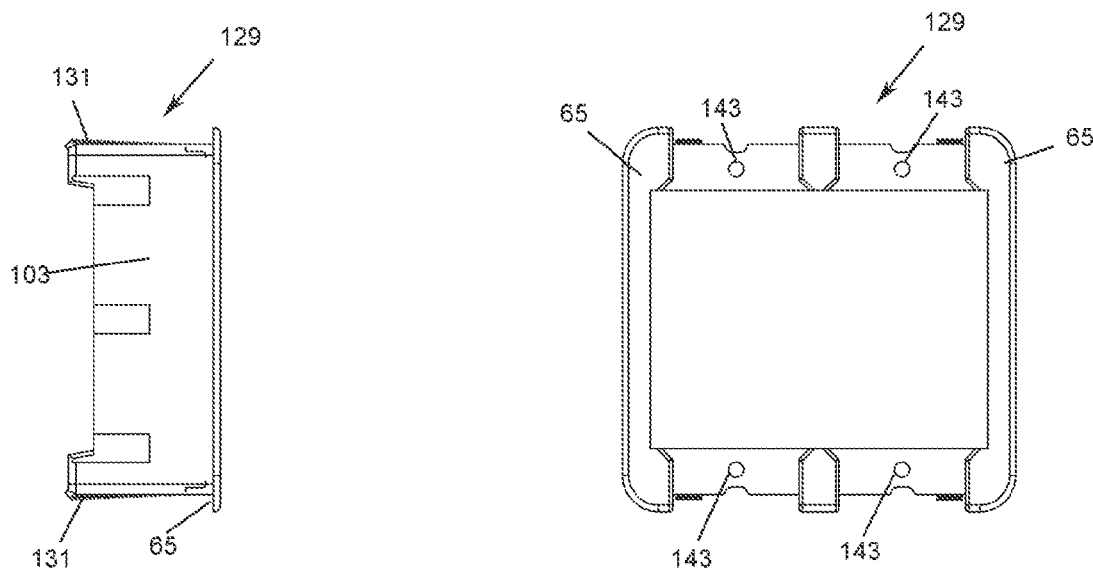
FIG. 25c
FIG. 25d

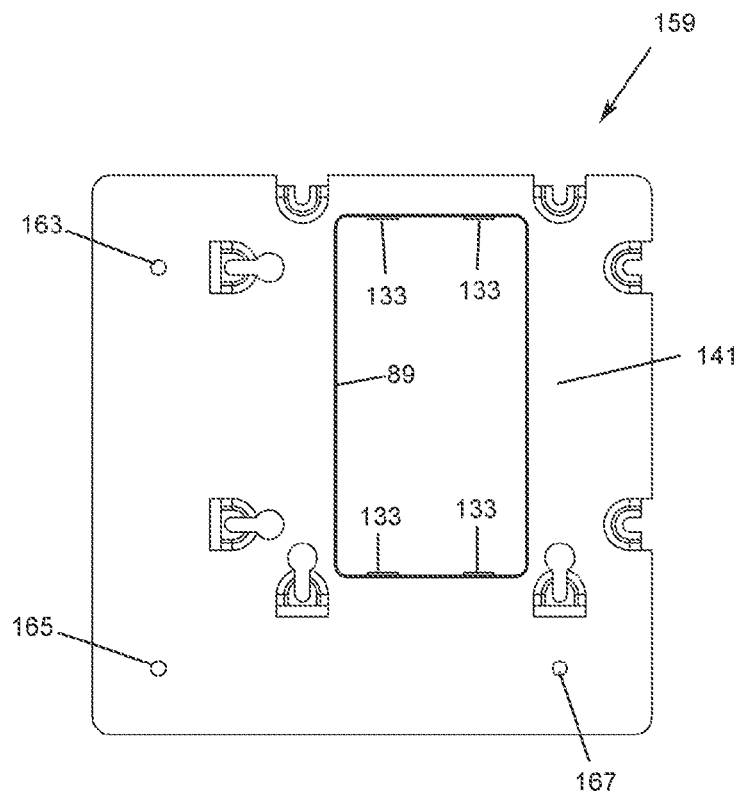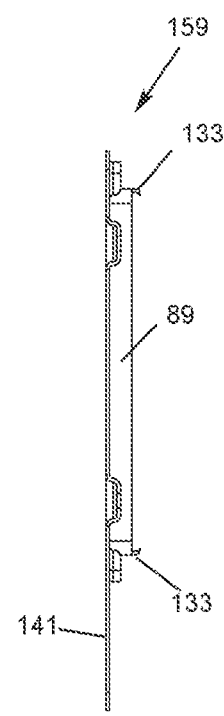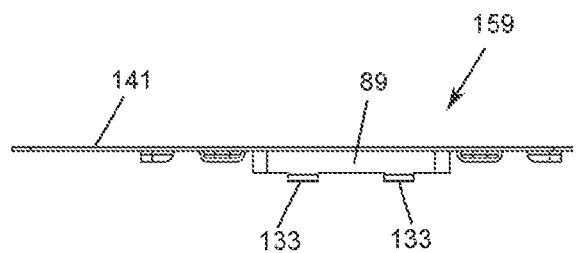
FIG. 30c  FIG. 30d
FIG. 30e

BRACKET AND SLEEVE ASSEMBLY

This is a continuation-in-part of co-pending application Ser. No. 13/795,538, filed Mar. 11, 2013. The present disclosure contains subject matter related to co-pending application Ser. No. 13/745,034, entitled ELECTRICAL BOX AND SLEEVE, filed by the current inventors on Jan. 18, 2013. The benefit of provisional application 61/704,153, filed Sep. 24, 2012 on behalf of inventors Jean-Guy Gagne and James Rogers, is claimed under 35 U.S.C. 119(e).

BACKGROUND

This disclosure is related to installation of electrical components in building walls, more particularly, to installation of support structure for line voltage and low voltage devices and the like. Existing electrical codes require containment of electrical switches and receptacles within electrical boxes. In new house or building construction, line voltage electrical boxes typically are attached to wall studs or joists before drywall or equivalent sheet material is applied to enclose the wall space. An opening is cut in the sheet material to accommodate the box or boxes that have been mounted in known positions. According to code, the enclosure of a line voltage electrical device must be in continuity with the wall substrate. Although low voltage applications, such as network communications, need not meet line voltage box requirements, means must be provided in the wall to provide appropriate access to internal wiring.

As the wall substrate, such as drywall, is fixed to the wall stud structure before installation of an electrical device can be completed, needs exist for efficiently locating and creating an opening in the substrate and for engaging the device in its enclosure. Cutting an opening in the wall substrate that is appropriately sized and placed can be time consuming. Difficulties exist in accurately locating a template to meet this need.

Conventionally, an electrical box is mounted to the wall stud so that the outer edge of the box is flush with the outer surface of the wall substrate, thereby meeting the code requirement for continuity. The installer must accurately locate the position of the box based on the wall substrate thickness. As various wall substrate thicknesses are in common use, a mounted box may need to be removed and repositioned if the substrate thickness is not compatible. As the outer edge of the box may not be square with the wall substrate, means should be provided to ensure that the facing of the mounted electrical device is flush with the plane of the substrate.

The conventional procedures for installation of electrical boxes and formation of substrate openings, therefore, involve a considerable expenditure of time and effort. Needs exist for a more accurate and easier way to facilitate installation of electrical devices in building walls, both in the formation of the substrate opening and in the provision of support for the electrical devices. Improvement is needed for an installation in which the electrical device is parallel to the front face of the wall substrate.

SUMMARY OF DISCLOSURE

The needs described above are fulfilled, at least in part, by an assembly including a flange that can be coupled to an interior wall structure, such as an electrical box. A planar surface of the flange abuts the outer surface of the wall substrate thus providing tight contact between the wall substrate and the interior structure.

Mating elements of the flange engage an electrical device to maintain the device in flush and parallel alignment with the substrate. Flexible tabs may extend from an inner opening periphery of the flange to couple with corresponding recesses in a housing of the electrical device. Cutout portions of the inner periphery mate with ribs on an outer surface of the housing to provide alignment between the flange and the device during insertion thereof.

The recesses are formed on the outer surface of the device housing at locations interior of a front facing housing surface. A plurality of channels extends from the front facing surface to the recesses, thereby facilitating easy removal of the electrical device from the flange.

The outer perimeter of the flange may be configured with a beveled edge. The flange may comprise slots for receiving elements of a cover plate for the electrical device. The flange may be configured to accommodate a plurality of electrical devices including, for example, devices configured for line voltage applications and as well as for low voltage communication devices.

An additional assembly embodiment may include a removable sleeve that is engageable with a flange directly fixed to an electrical box or the like. The flange is configured as a template guide for cutting the wall substrate opening. The sleeve contains an outer longitudinal surface with a plurality of teeth spaced along its extent. A plurality of retainers extends from an inner opening periphery of the flange for engaging the teeth of the sleeve. Retainers extend from an inner longitudinal surface of the sleeve to mate with recesses in the electrical device when inserted in the sleeve.

When inserted through an opening in a wall substrate and engaged with the flange, the sleeve secures tight contact between the wall substrate and the electrical box, irrespective of the thickness of the wall substrate. The electrical device can be inserted through the wall substrate opening for coupling with the sleeve.

Additional advantages of the present disclosure will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 1b is a perspective view of the assembled installation shown in FIG. 1a;

FIG. 2b is a front view of the embodiment shown in FIGS. 1b and 2a;

FIGS. 3a-3e are various detail views of the flange element of FIG. 1a;

FIG. 4a is a perspective exploded view of a modification of the installation assembly shown in FIG. 1a;

FIG. 4b is a perspective view of the assembled installation shown in FIG. 4a;

FIGS. 5a-5d are various views of the electrical device shown in FIG. 4a;

FIGS. 6a-6b are views of the cover plate shown in FIG. 4a;

FIGS. 10c-10d are perspective detail views of the flange of FIGS. 10a-10b;

FIGS. 11a-11b are perspective views of an alternative embodiment to the one shown in FIGS. 4a-4b;

FIG. 11c is a front view of the embodiment of FIGS. 11a-11b;

FIG. 11d is a section view taken from FIG. 11c;

FIG. 11e is an enlarged detail view of a portion of FIG. 11d;

FIGS. 13a-13e are various detail views of the sleeve of FIG. 12a;

FIG. 17b is a front view of the installation shown in FIG. 17a;

FIGS. 19a-19e are various detail views of the flange collar of FIGS. 17a-17c;

FIG. 21a is an exploded isometric view of the embodiment;

FIG. 21b is an isometric view of the embodiment;

FIGS. 21c-21e are top, front and side views, respectively, of the embodiment;

FIG. 21f is a section view taken from FIG. 21d;

FIG. 21g is a detail view taken from FIG. 21f;

FIG. 22a is an exploded isometric view of the embodiment;

FIG. 22b is an isometric view of the embodiment;

FIG. 23a is an exploded isometric view of the embodiment in combination with an electrical box;

FIG. 23b is an isometric view of the embodiment shown in FIG. 23a;

FIG. 25a is a front isometric view of the sleeve shown in FIGS. 21a-23b;

FIGS. 25b-25d are top, side and front views, respectively, of the sleeve shown in FIG. 25a;

FIG. 26a is an exploded isometric view of the alternative embodiment;

FIG. 26b is an isometric view of the alternative sleeve with bracket;

FIGS. 26c-26e are top, front and side views, respectively, of the alternative sleeve with bracket;

FIG. 26f is a section view taken from FIG. 26d;

FIG. 26g is a detail view taken from FIG. 26f;

FIG. 28a is a front isometric view of the cutting tool in situ;

FIG. 28b is a front orthographic view of the cutting tool;

FIG. 28c is a section view taken from FIG. 28b;

FIG. 28d is a detail view taken from FIG. 28c;

FIGS. 30c-30e are front, side and bottom views of the single gang bracket shown in FIGS. 29a-29b;

FIGS. 32b-32d are top, side and front views of the bracket shown in FIG. 32a;

FIG. 34b is an isometric view of the device illustrated in FIG. 34a;

FIG. 35b is an isometric view of the arrangement shown in FIG. 35a;

DETAILED DISCLOSURE

Figure 1A:
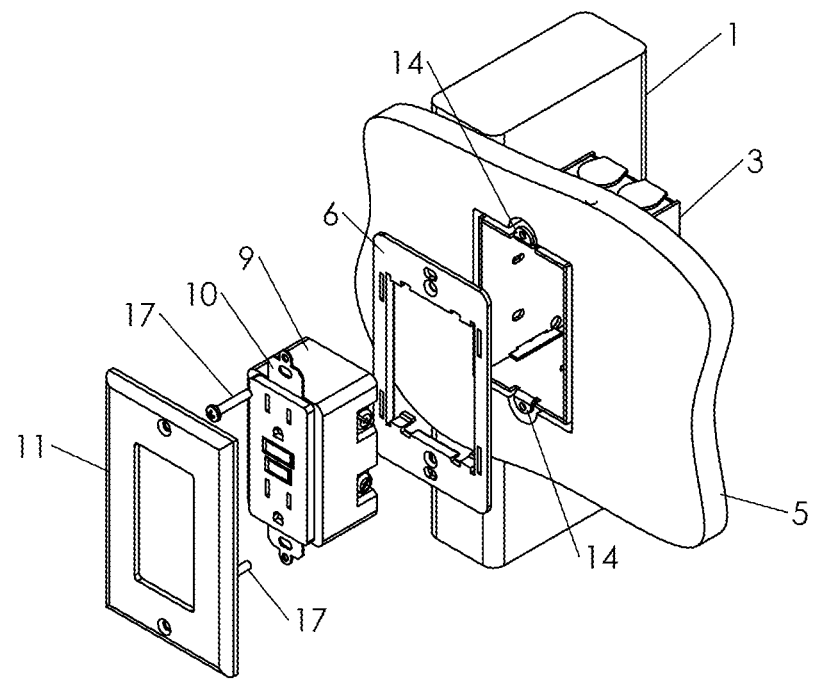
FIG. 1a is an exploded perspective view of a preferred embodiment of an installation assembly.
Figure 1B:
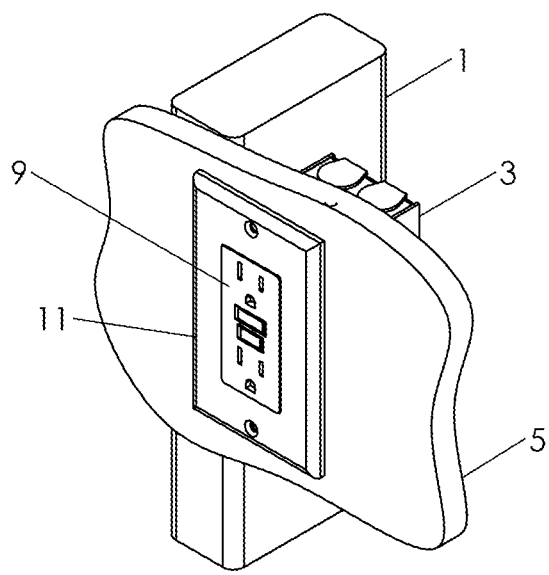

A preferred embodiment of an installation assembly is shown in FIGS. 1a and 1b. Electrical box 3 may be mounted in conventional manner on wall stud 1 behind wall substrate 5. Flange 6 is sandwiched between mounting plates 10 of conventional electrical device 9, illustrated herein as an outlet. It should be understood that the assembly is applicable for use with other electrical devices, such as switches and the like. Fasteners 17, threaded into holes on tab 14 of box 3, hold both device 9 and flange 6 in place. Flange 6 is flush with the outer surface of wall substrate 5. Flange 6 may be fabricated of injection molded plastic or metal. Cover plate 11 may be mounted with threaded fasteners, not shown, on device 9 in conventional manner.

Figure 2A:
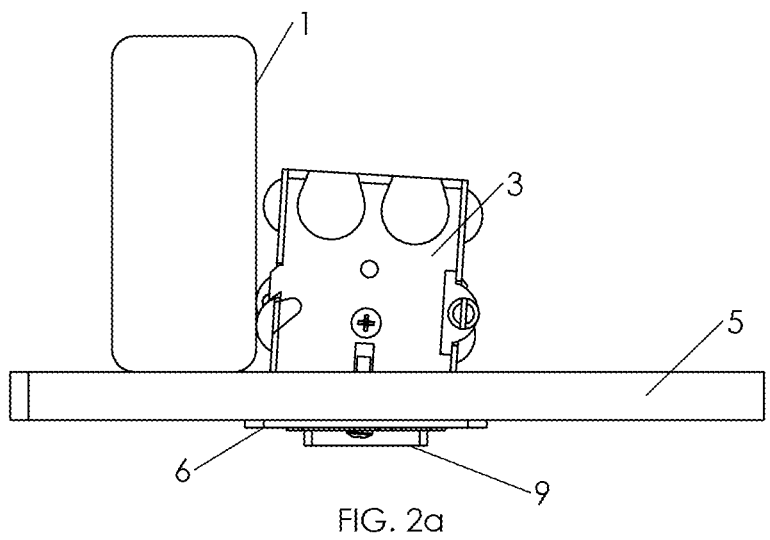
FIG. 2a is a top plan view of the assembled installation shown in FIG. 1a, applied to an electrical box mounted askew on a stud.
Figure 2B:
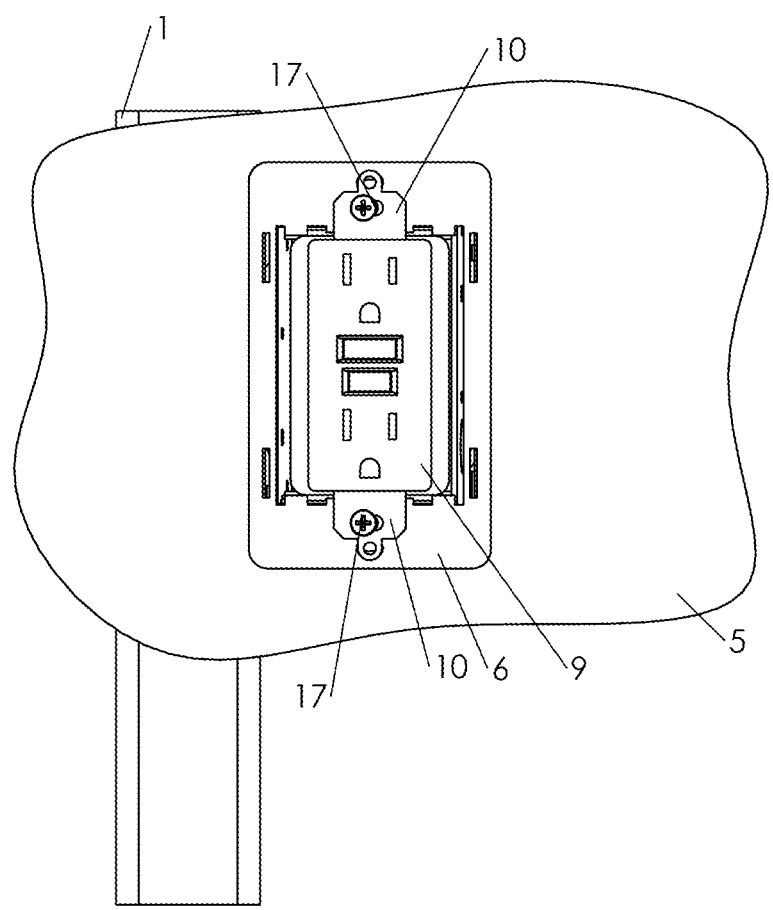
Figure 3C:
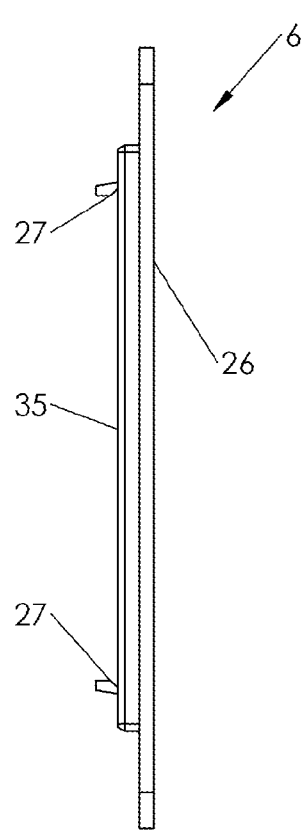
Figure 3D:
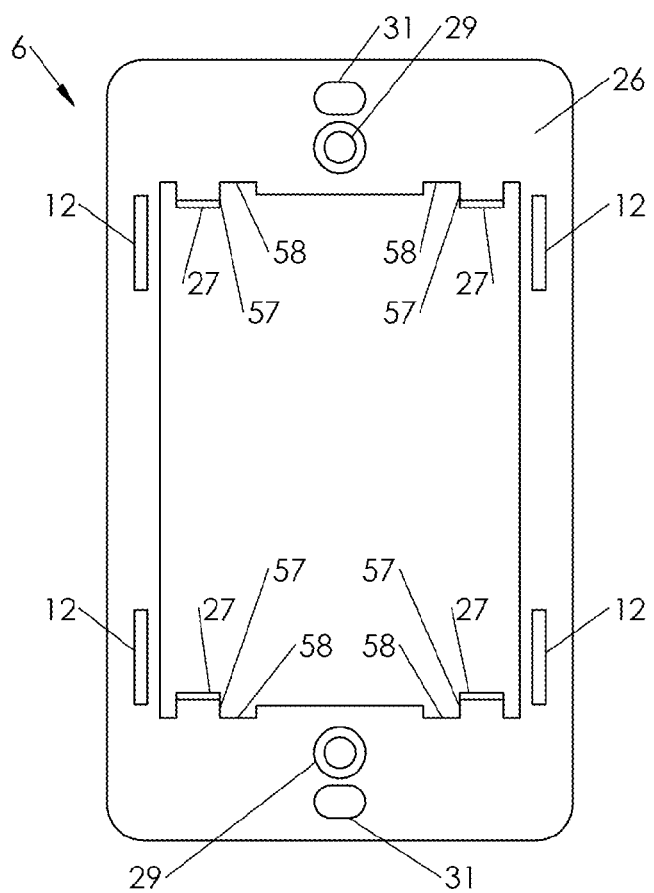
Figure 3E:
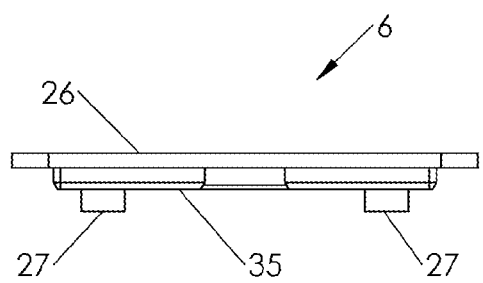

Flange 6 thus ensures that the front surface of device 9 can be mounted parallel to drywall 5 even if box 3 is not. In the latter instance, as illustrated in FIGS. 2a and 2b, electrical box 3 is mounted askew with respect to stud 1 and wall substrate 5. Flange 6 rests flush against drywall 5 allowing the front face of device 9 to be mounted parallel to the outer surface of drywall 5. The presence of flange 6 device avoids the likelihood that mounting plates 10 would dig into wall substrate 5 and skew device 9, as would occur during conventional installation.

Figure 6A:
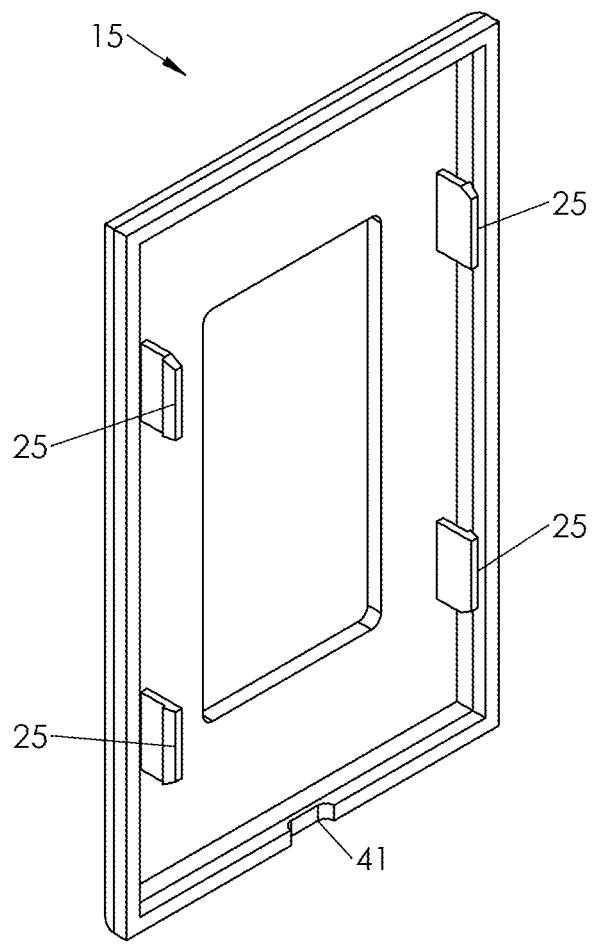
Figure 6B:
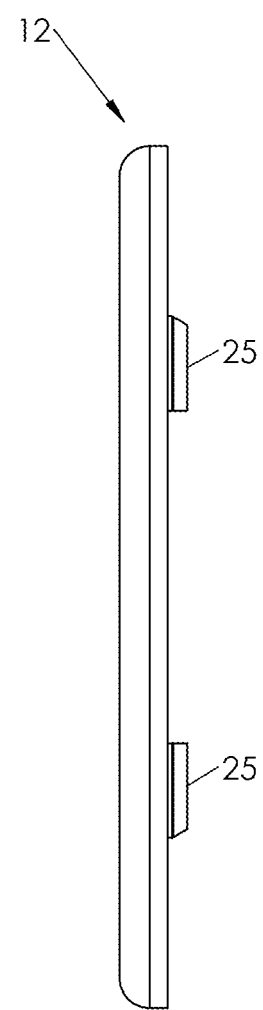

FIGS. 3a-3e are detailed views of flange 6 of FIG. 1a. Flange 26 contains mounting holes 29 for attachment to the electrical box. Flange 26 can accommodate screw attachment to a cover plate 11, shown in FIG. 1a via clearance holes 31. Cover plate retainer holes 12 are provided to accommodate a snap-on cover plate 15, shown in FIGS. 6a and 6b, in lieu of cover plate 11. Sprung retainers 27 extend inwardly from the inner opening periphery at the upper and lower corners thereof. Ribs 35 give added strength to flange 26, reducing tendency of deformation when installed.

Centering cutout portions 57 and 58 allow snap-in device 13, shown in the modified embodiment of FIGS. 4a-4e, to be centered in the opening. In this installation, the hole in drywall 5 may be cut around the outside perimeter of electrical box 3 in conventional manner. Flange 6 is fastened to box 3 with threaded fasteners 17 through mounting holes 29 into holes on tab 14 of the box. Snap-in electrical device 13, illustrated as an outlet, may then be pushed into flange 6.

Electrical device 13 is illustrated in FIGS. 5a-5d. Recesses 55 are located proximate the four corners of the device housing in the top and bottom surfaces thereof. The recesses extend inwardly from the front surface of the housing. Centering ribs 51 on the top and bottom surfaces allow device 13 to be centered and solidly retained horizontally and vertically. Chamfer 53 on the end of each rib 51 allows easy installation between the matching cutout portions of flange 6.

Referring to FIGS. 4a-4e, as device 13 is inserted, side and top surfaces of ribs 51 on device 13 run along horizontal centering surfaces 57 and vertical centering surfaces 58 respectively. When mounting flange 10 of the device reaches flange 6, four sprung retainers 27 drop into device recesses 55 to secure the device in place. Removal of the device may be accomplished by flexing retainers 27 out of recesses 55. Retainers 27 are accessed from either side of device 13 for removal. Flexible barbed retainers 25 of snap-on cover plate 15 pass through holes 12 in flange 6 and retain on the backside thereof. Removal of the cover plate 15 can be done by inserting a screw driver or the like in recess 41 to pry off cover plate 15. Engagement of the device with the flange and cover plate may best be seen in the partial detail view of FIG. 4e.

Figure 7A:
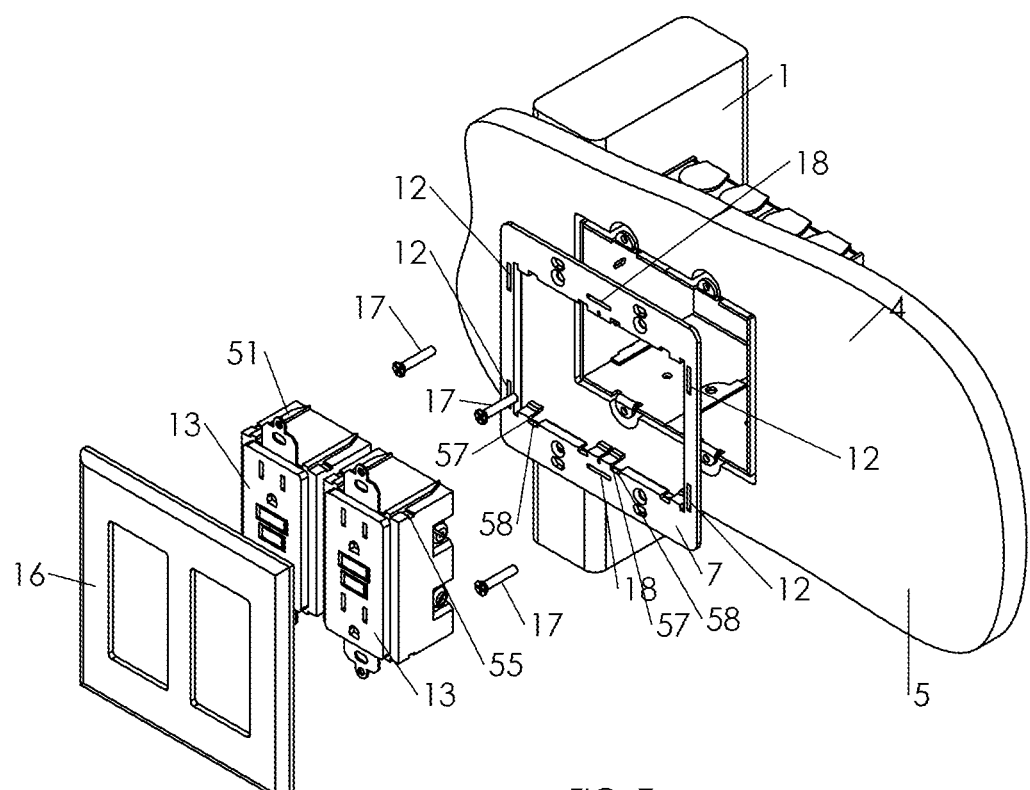
FIGS. 7a-7b are exploded and assembled perspective views, respectively, of a two gang installation of the embodiment shown in FIGS. 4a-4b.
Figure 7B:
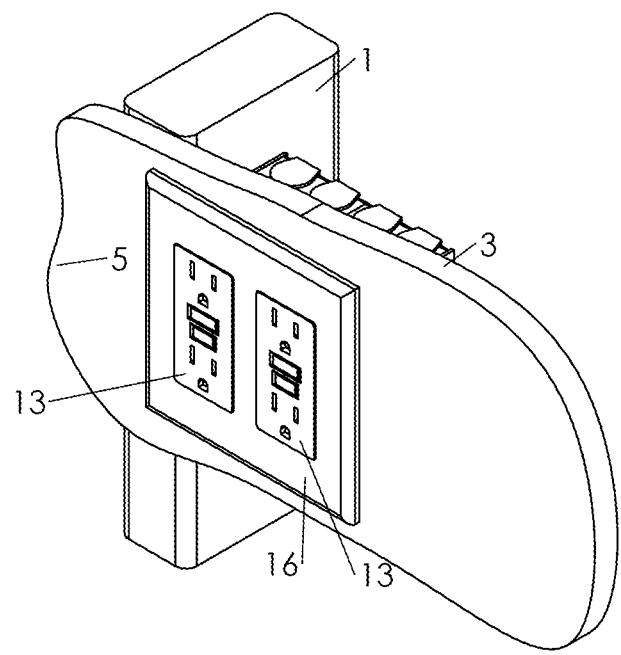
Figure 8A:
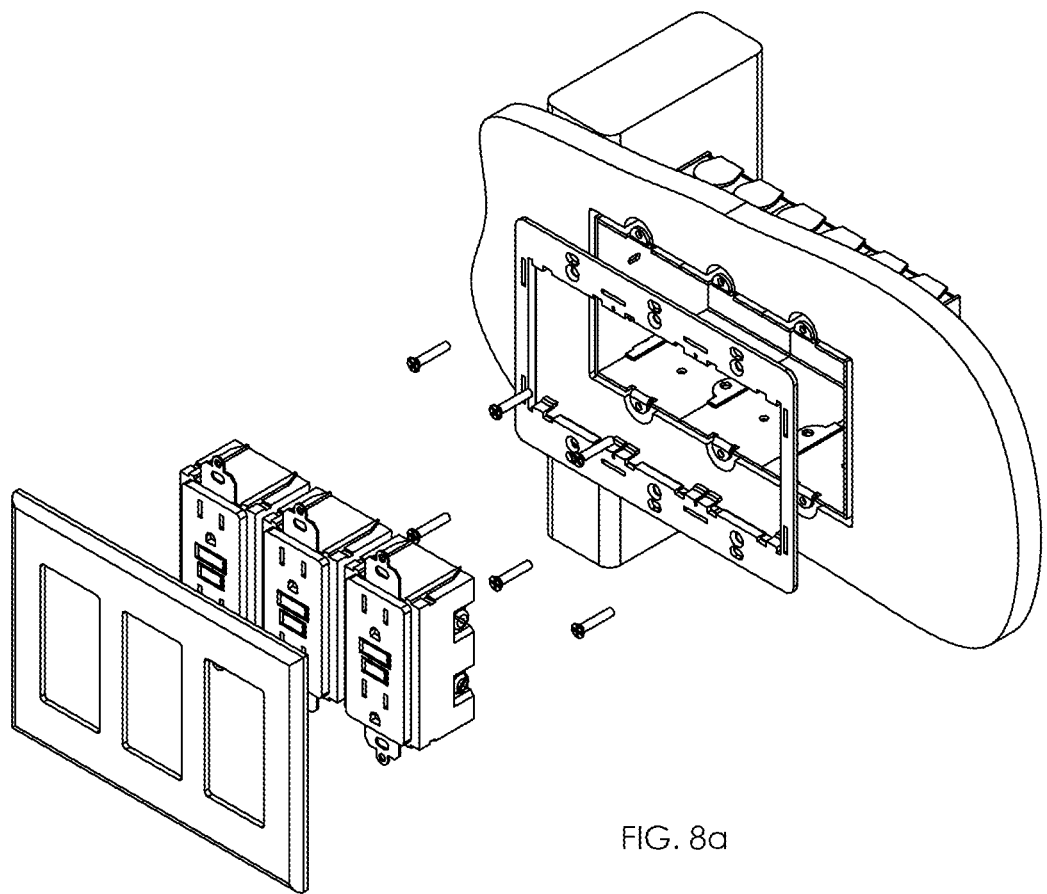
FIGS. 8a-b are exploded and assembled perspective views, respectively, of a three gang installation of the embodiment shown in FIGS. 4a-b.
Figure 8B:
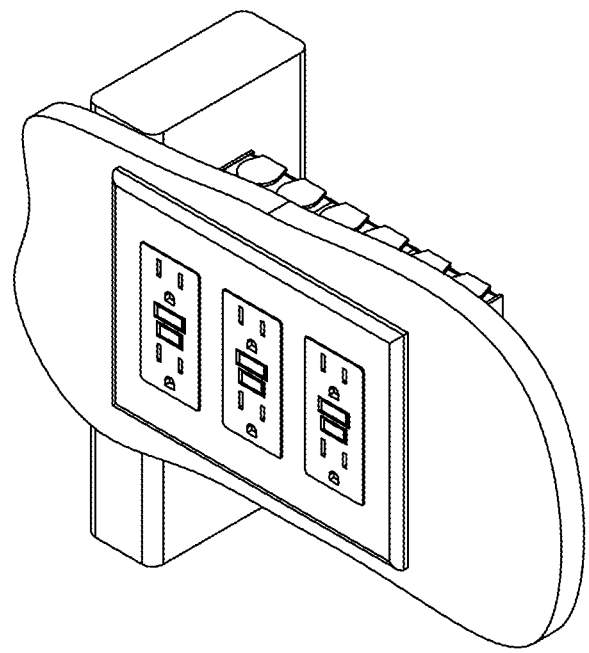
Figure 9A:
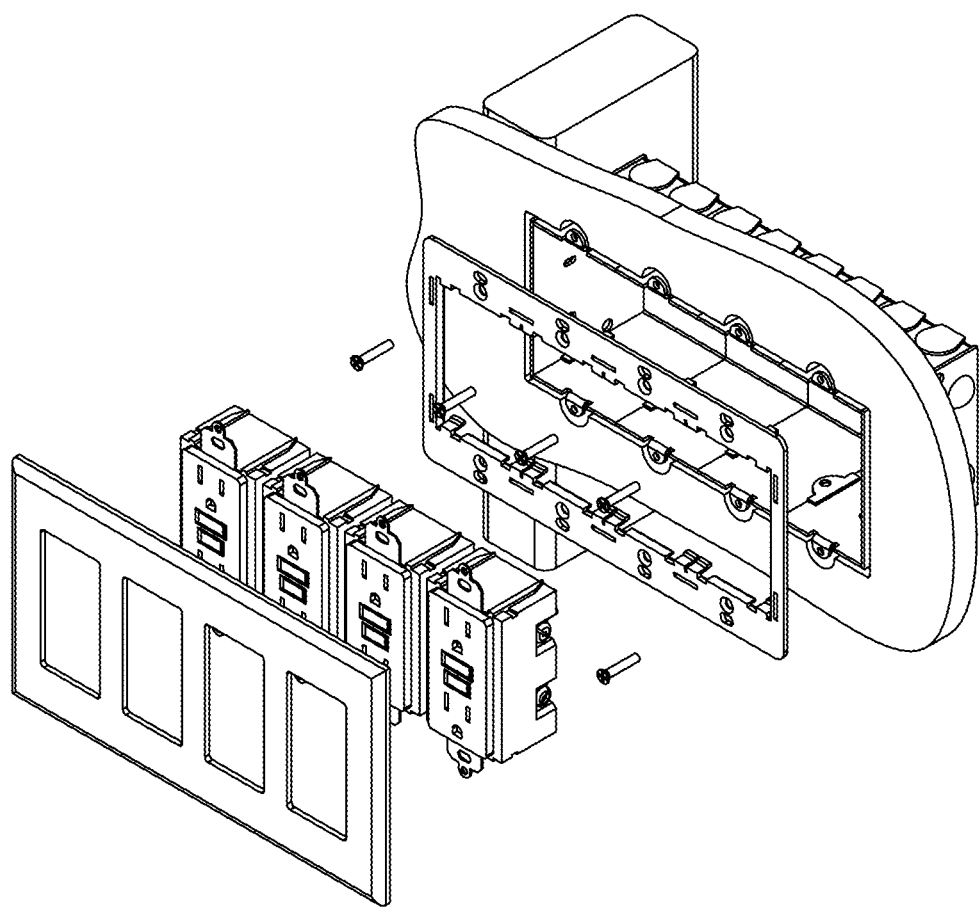
FIGS. 9a-9b are exploded and assembled perspective views, respectively, of a four gang installation of the embodiment shown in FIGS. 4a-4b.
Figure 9B:
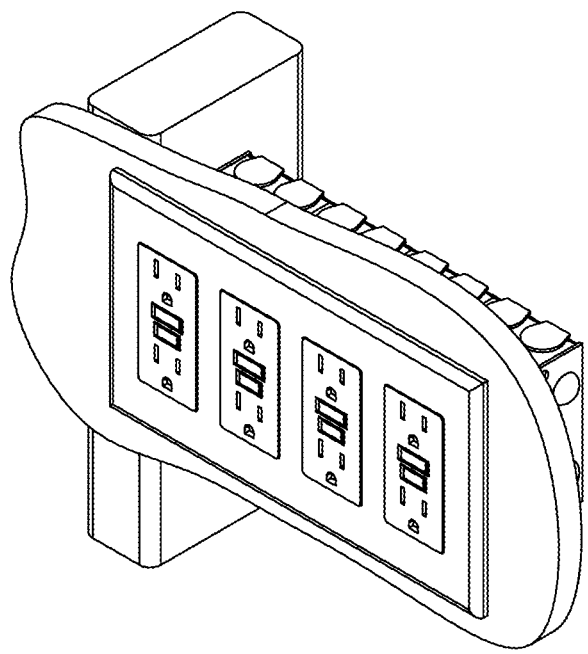

FIGS. 7a-7b illustrate the embodiment of FIGS. 4a-4e, for use in accommodating a two gang installation. Two gang flange 7 is installed via fasteners 17 on two gang electrical box 4. Electrical devices 13 are snapped-in to flush flange 7. Two gang cover plate 16 is snapped on to flush flange 7 via side holes 12 and mid span holes 18. Device centering ribs 51 and flush flange horizontal centering surfaces 57 allow cover plate 16 to be installed without horizontal adjustment of the devices, as would be required in conventional installations. This feature is a benefit to all multigang installations. Similar installations are shown in three and four gang configurations in FIGS. 8a-8b and 9a-9b, respectively.

Figure 4A:
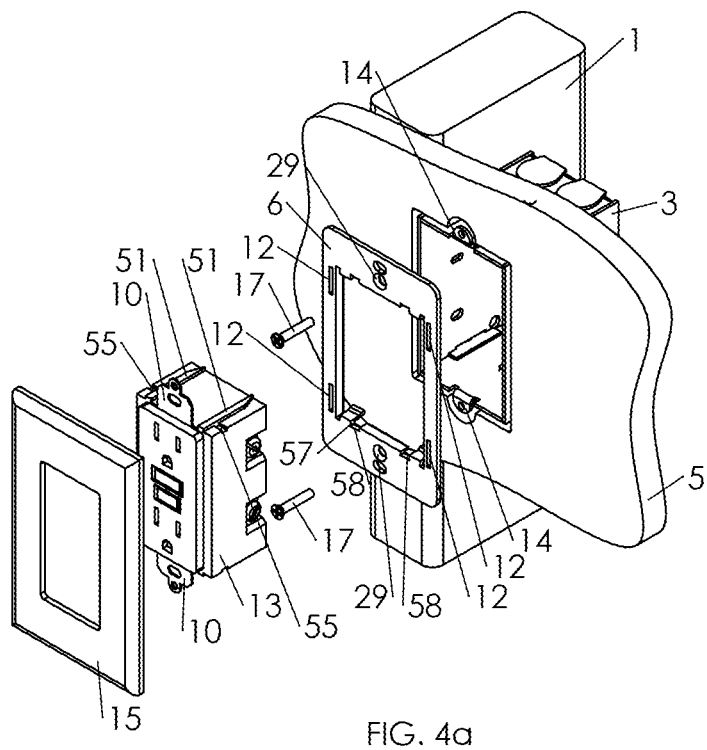
Figure 4B:
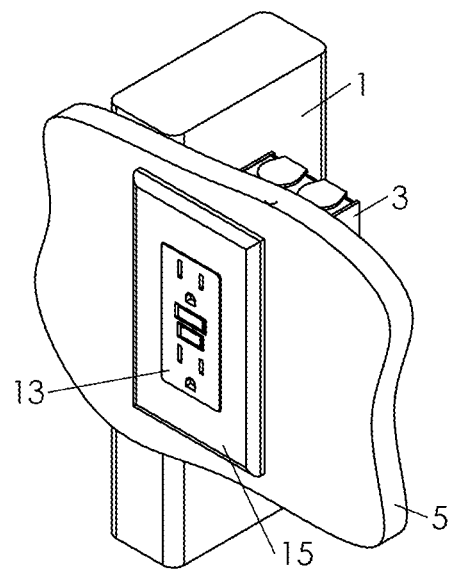
Figure 4C:
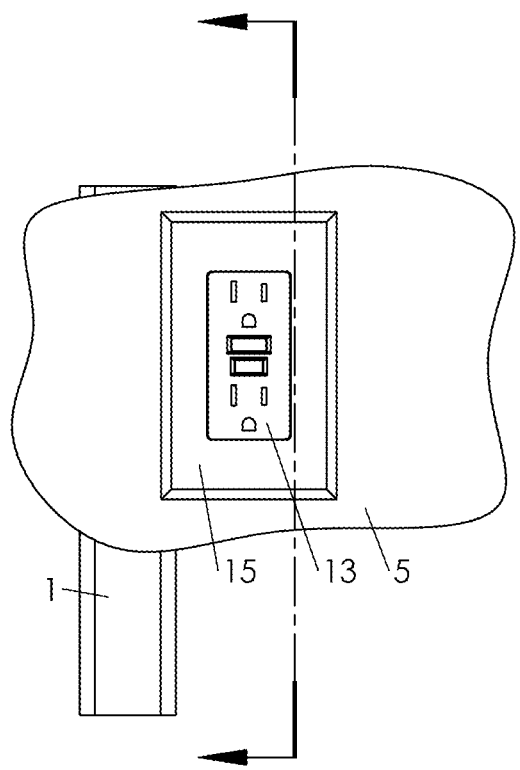
FIG. 4c is a front view of the installation shown in FIG. 4b.
Figure 4D:
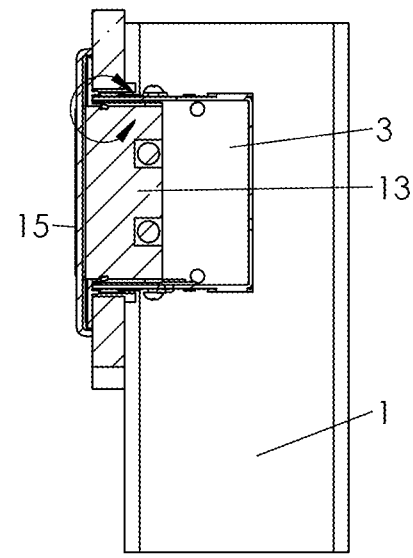
FIG. 4d is a section view taken from FIG. 4c.
Figure 4E:
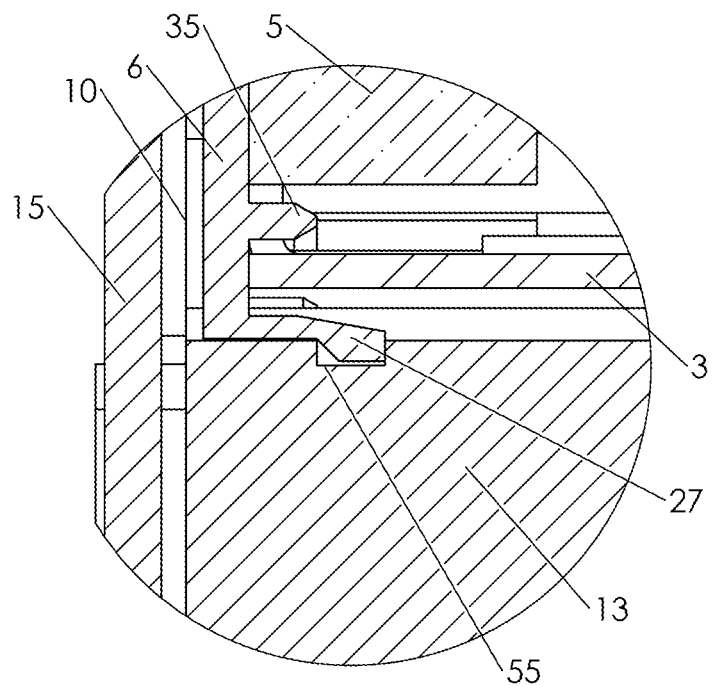
FIG. 4e is an enlarged view of a portion of FIG. 4d.
Figure 5A:
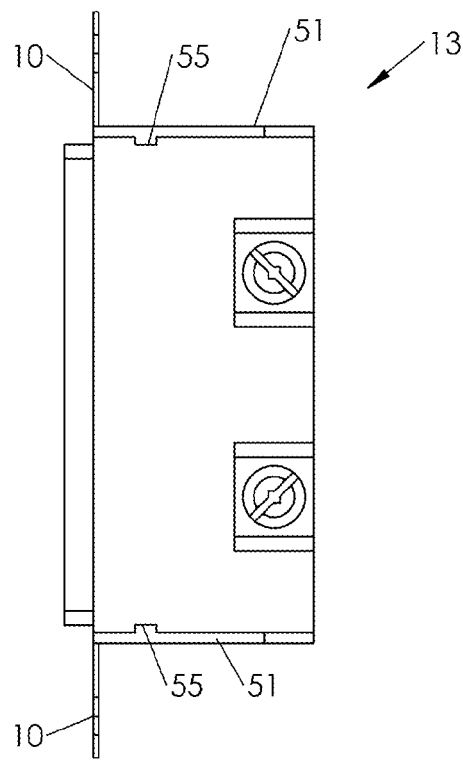
Figure 5B:
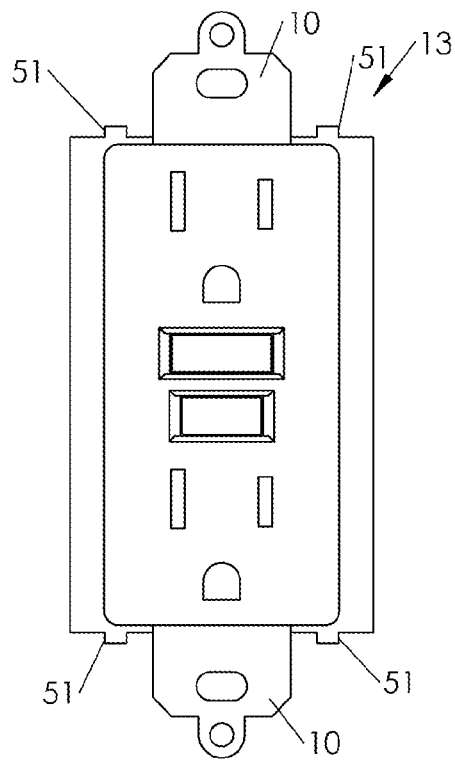
Figure 5C:
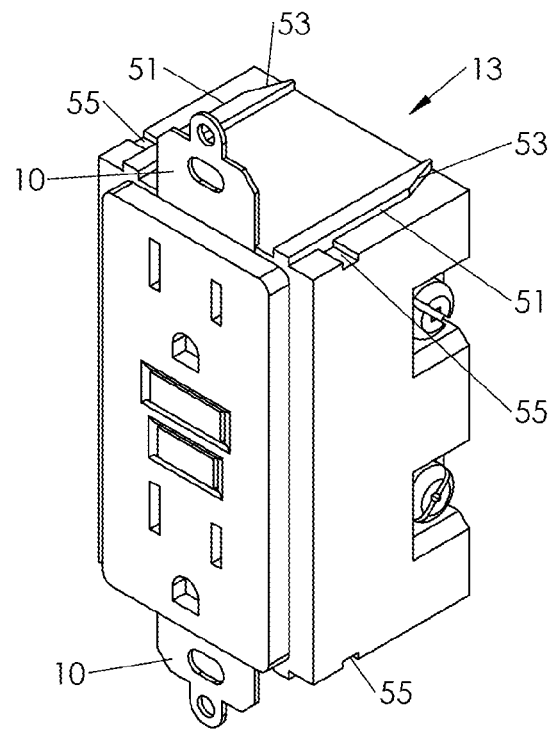
Figure 5D:
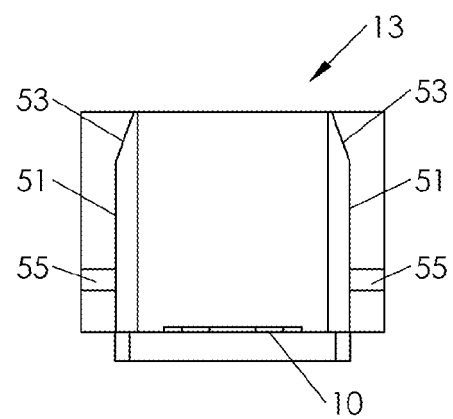
Figure 10A:
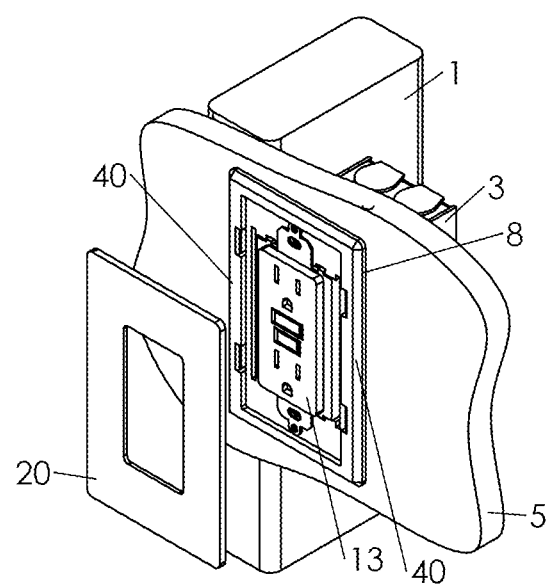
FIGS. 10a-10b are perspective views of a modification of the embodiment shown in FIGS. 4a-4b.
Figure 10B:
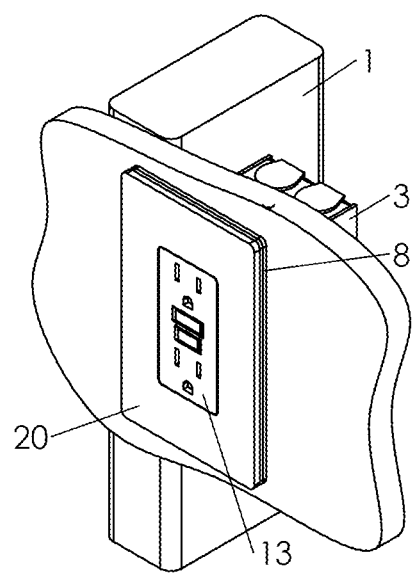

FIGS. 10a-10b illustrates a variation to the single gang snap-in configuration of the flush flange assembly shown in FIGS. 4a-4b. Flange 8 corresponds to flange 6 shown previously. Flange 8 has proud perimeter embossment 40, giving additional strength to the part. The embossed perimeter is visible after the matching cover plate 20 is installed. Flange 8 is shown in more detail in FIGS. 10c-10d.

Figure 11F:
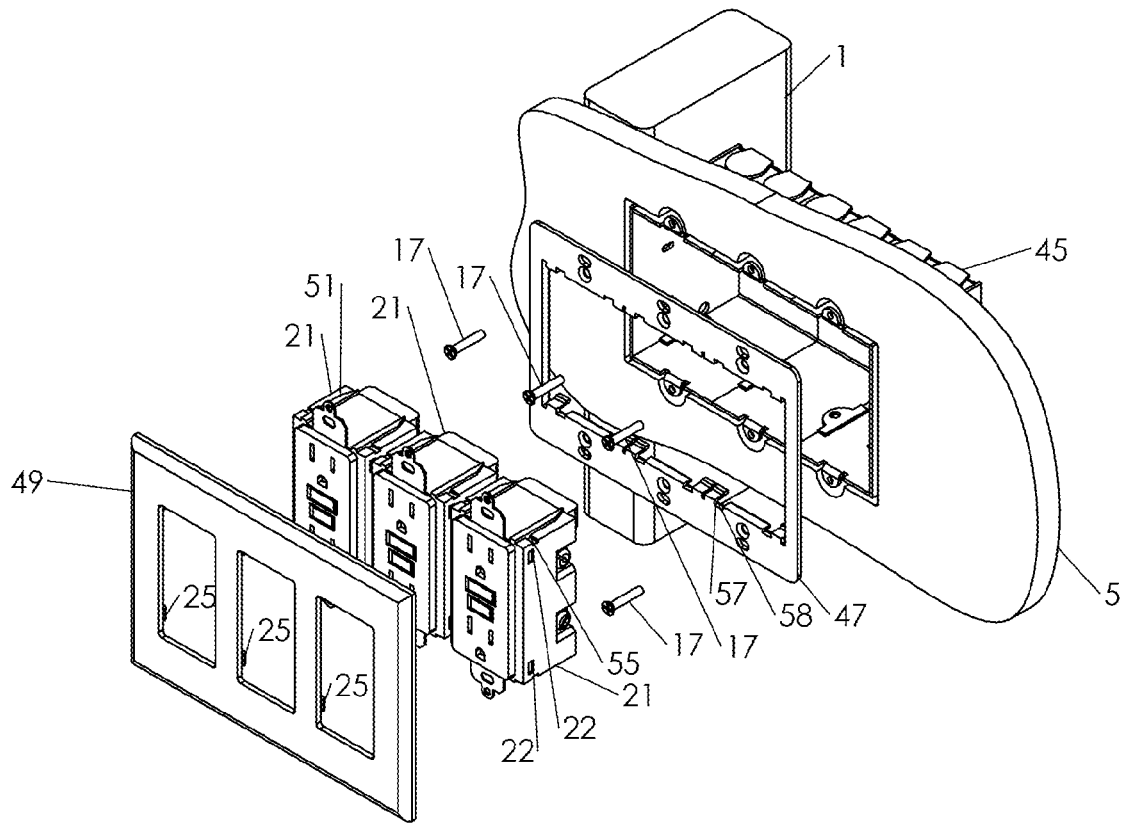
FIGS. 11f-11g are exploded and assembled perspective views, respectively, of a three gang installation of the embodiment shown in FIGS. 11a-11b.
Figure 11G:
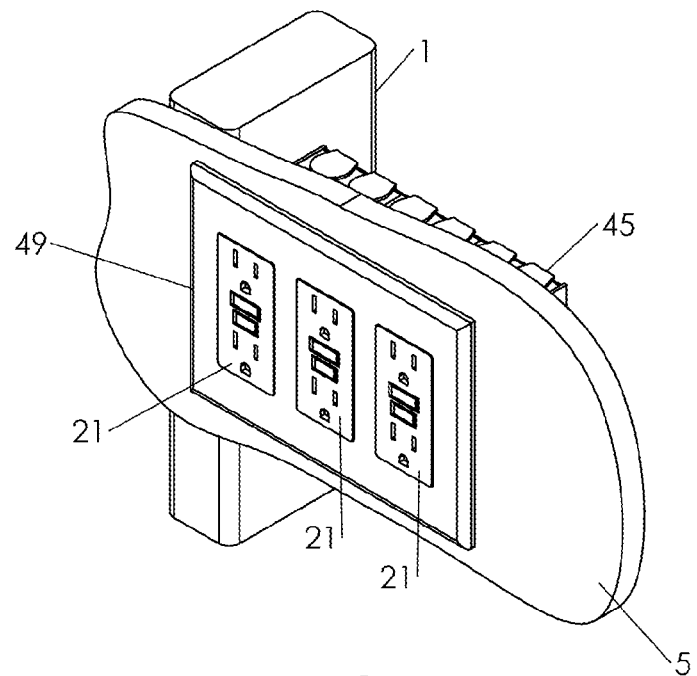

FIGS. 11a-11e illustrate device 21, in an alternate embodiment of the snap-in device shown previously, mounted via fasteners 17 to conventional electrical box 3. Recesses 22 on either side in either side of device 21 receive resilient retainers 25 on cover plate 23, holding it in place. This arrangement permits direct mounting of a cover plate directly to a device without need for screws or attachment to the flange. A multigang arrangement is shown in FIGS. 11f-11g. Multigang cover plate 49 include resilient retainers 25 that snap-on to recesses 22 on the sides of devices 21. Devices 21 snap-in to flange 47. Horizontal centering surfaces 57 of flange 47 index devices 21 to provide ideal spacing and easy installation of snap-on cover plate 49.

Figure 12A:
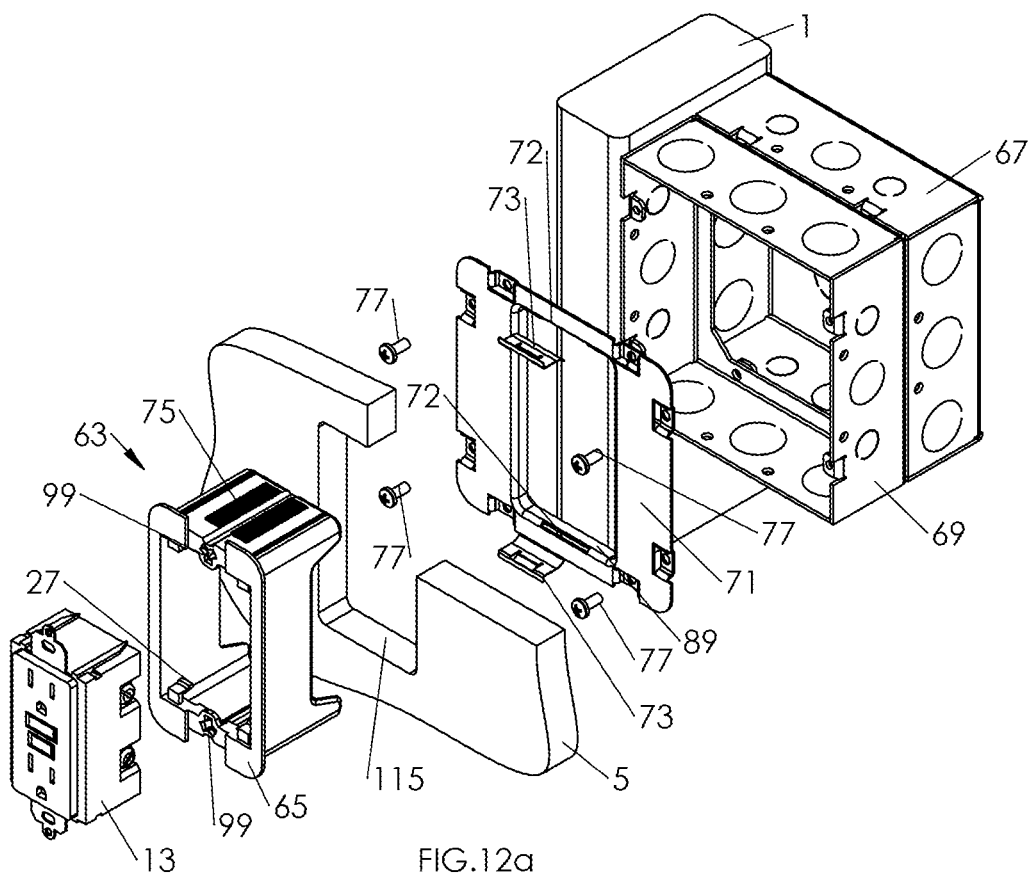
FIGS. 12a and 12b are exploded and assembled perspective views, respectively, of an alternative embodiment.
Figure 12B:
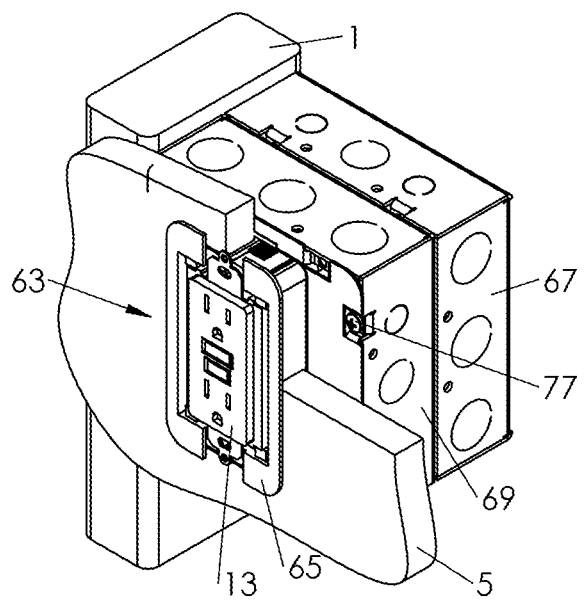
Figure 13A:
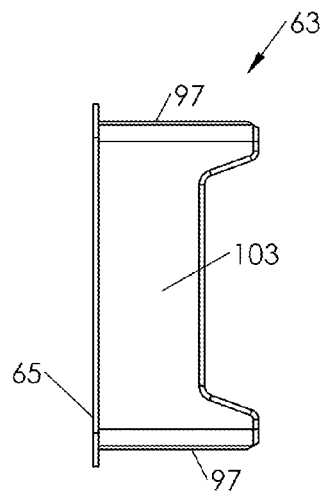
Figure 13B:
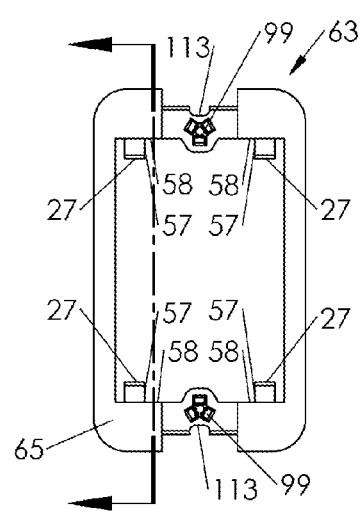
Figure 13C:
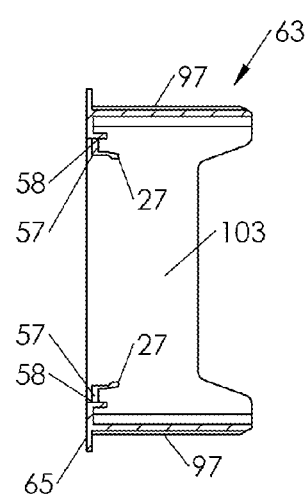
Figure 13D:
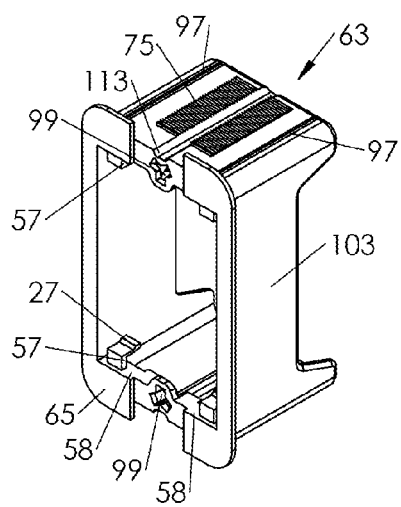
Figure 13E:
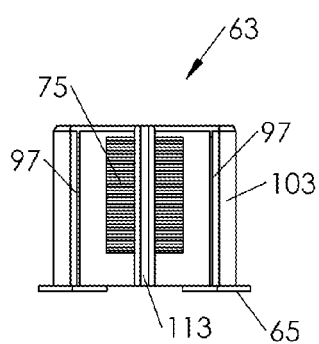

FIGS. 12a-12b illustrate an alternative assembly, similar in some respects to that disclosed in co-pending application Ser. No. 13/745,034 of the current inventors, identified above. Sleeve 63, having barbed teeth 75 along an extent of its outer surface, can be mounted in flange collar 71. As illustrated, flange collar 71 is attached by screws 77 to electrical box extension 69 mounted on electrical box 67. The box structure is mounted on stud 1. Sprung retainers 73 extend from on the top and bottom of the inner periphery of flange collar 71 to engage teeth 75 on the top and bottom outer surfaces of sleeve 63. Sleeve 63 has internal ratchet threads 99 to receive mounting screws for accommodating installation of a conventional device.

Snap-in device 13 snaps into retainers 27 of sleeve 63, illustrated in FIGS. 12a-12b. Wall substrate 5, illustrated as drywall, contains hole 115 that provides access to the roughed in box assembly 67 and 69, and flange collar 71. Cutting of the drywall is achieved by running a rotating drywall cutting tool with a guide tip tool along internal perimeter flange 89 of flange collar 71. Retainers 73, which may be made of spring steel, can be inserted through slits 72 on flange collar 71. The retainers are sufficiently recessed beyond internal perimeter flange 89 to prevent the cutting tool from contacting them. Flange collar 71 can be mounted 90 degrees to the shown orientation if a horizontally oriented device is desired.

As shown in FIGS. 13a-13e, a single gang sleeve 63 includes perimeter wall 103 that completely encloses the device and electrical connections of the installations regardless of the thickness of the wall substrate. For example, the wall substrate may include drywall with additional cladding, such as tile. Such enclosure meets electrical code requirements for line voltage installations. Flange 65 serves to apply pressure to the drywall on the front of the installation to effectively sandwich the drywall, resulting in a well secured installation. Ribs 97 serve to ensure that sleeve 63 remains centered vertically in flange collar 71. Removal slots 113 allow a removal tool such as a screwdriver to be inserted in order to flex sprung retainer 73 of flange collar 71 outwardly to disengage it from teeth 75, thereby permitting removal of sleeve 63 from flange collar 71. Horizontal centering surfaces 57 and vertical centering surfaces 58, serve to center snap-in device 13. Internal ratchet threads 99, have biased arms with a single thread which flex out of the way as an appropriately sized conventional threaded fastener is pushed in to full depth and tightened with a screwdriver. The bias secures the fastener until unscrewed. This internal ratchet thread feature can be used in conventional electrical boxes.

Figure 14A:
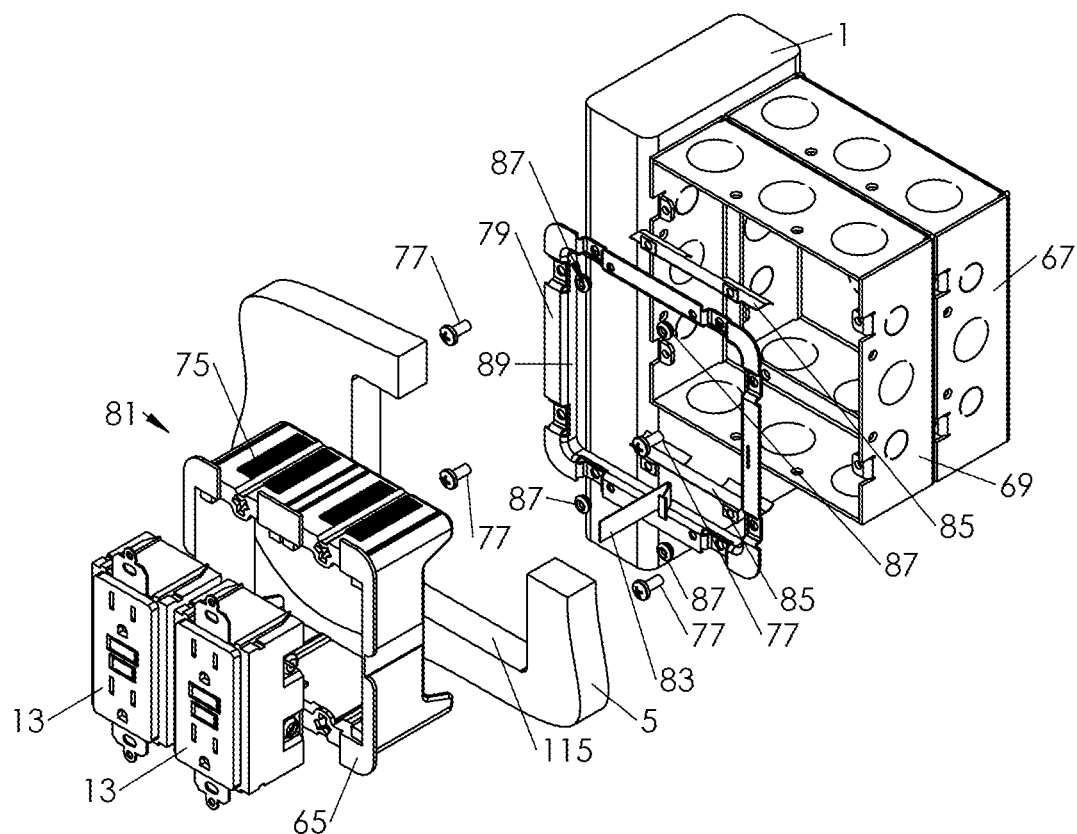
FIGS. 14a-14b are exploded and assembled perspective views of a two gang installation of the embodiment shown in FIGS. 12a-12b.
Figure 14B:
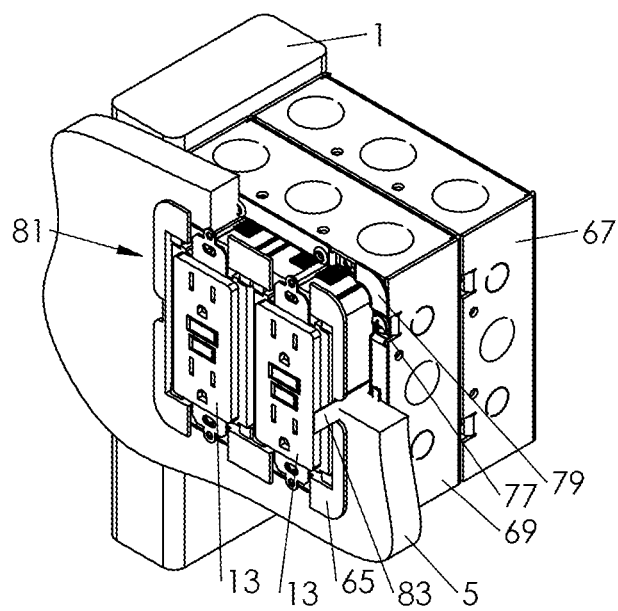
Figure 15A:
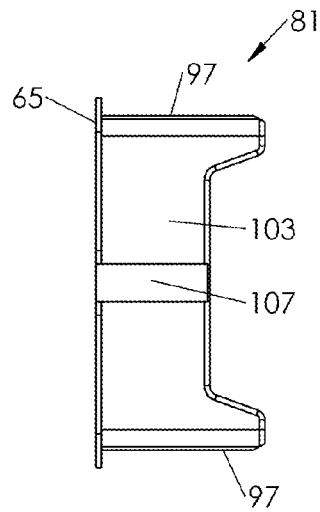
FIGS. 15a-15d are various detail views of the sleeve of FIGS. 14a-14b.
Figure 15B:
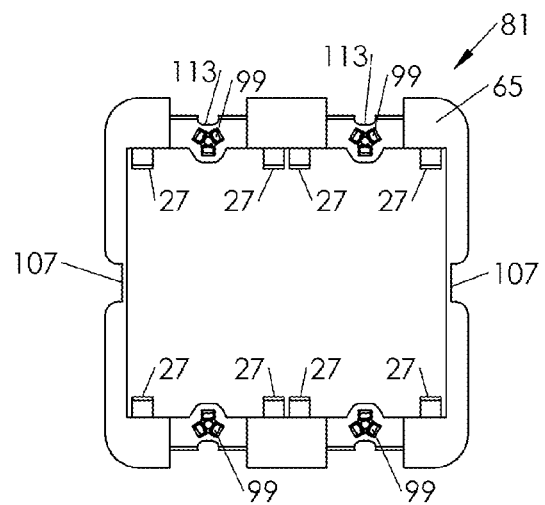
Figure 15C:
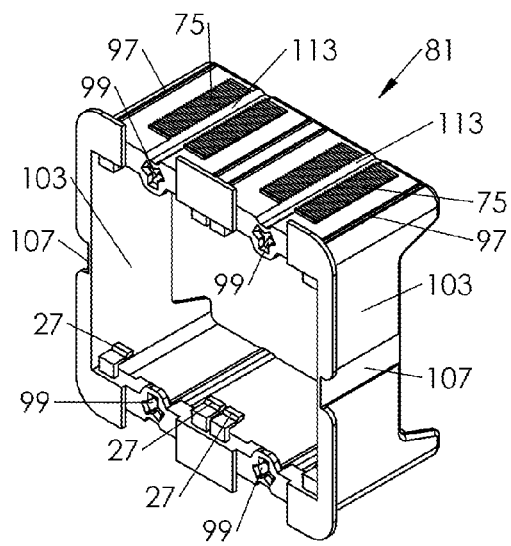
Figure 15D:
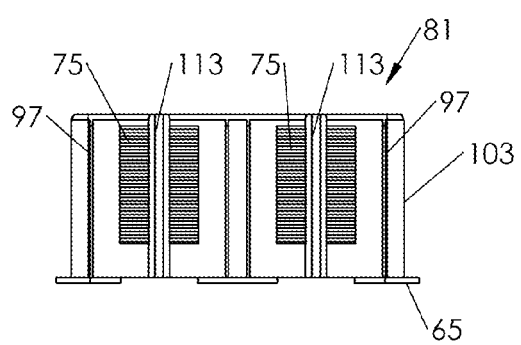
Figure 16A:
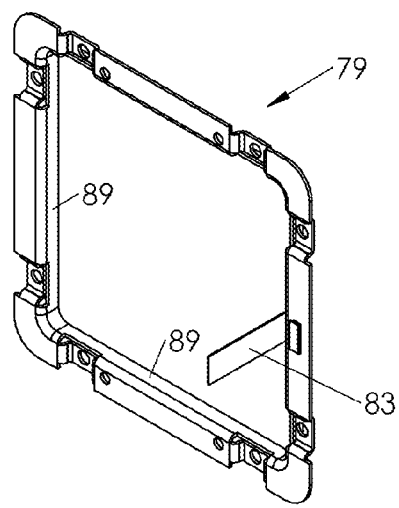
FIGS. 16a-16e are various detail views of the flange collar of FIGS. 14a-14b.
Figure 16B:
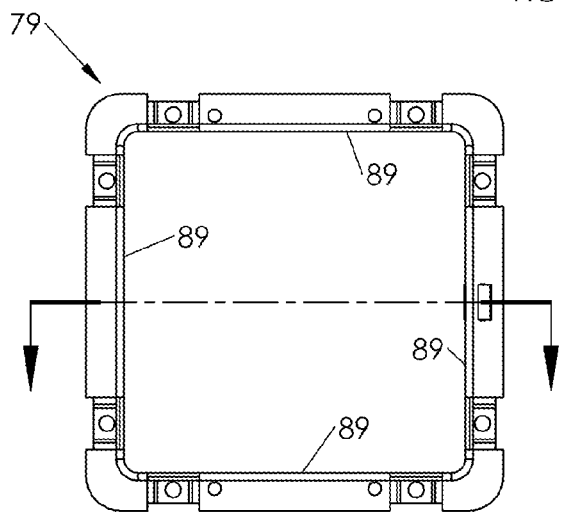
Figure 16C:
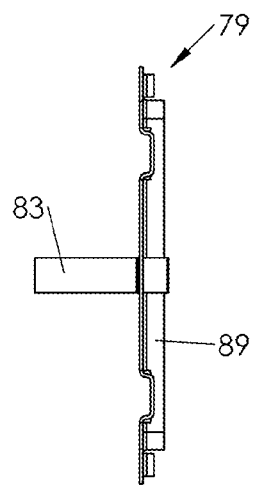
Figure 16D:
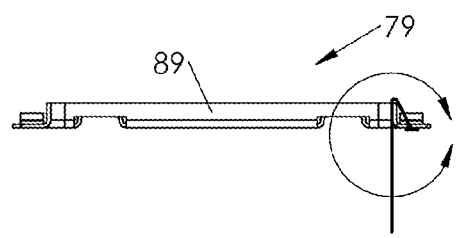
Figure 16E:
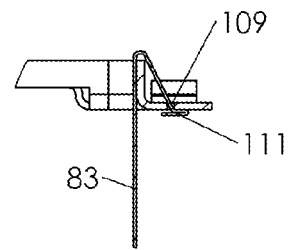

FIGS. 14a-14b illustrate a two gang embodiment of the assembly seen in FIGS. 13a-13e. Two gang collar 79 is screwed via fasteners 77 to electrical box extension 69 mounted on electrical box 67 and fixed to stud 1. Flange collar 79 has internal perimeter flange 89 that serves to provide a cutting jig for drywall hole 115. Sprung retainers 85 are fixed with rivets 87 to collar 79. Collar 79 has pull 83 made of flexible webbing. Collar 79 is oriented with pull 83 on the non-stud side of box extension 69. Pull 83 allows the installer to provide a counterforce on the unsupported side of the box when inserting sleeve 81 through hole 115 into collar 79 effectively sandwiching drywall 5 between collar 79 and flange 67 of sleeve 81. Sprung retainers 85 of collar 79 retain teeth 75 of collar 79. Pull 83 can be cut off after use or pushed back into the assembly or left hanging and concealed by a cover plate. Devices 13 snap into sleeve 81. Collar 79 can be mounted 90 degrees to the shown orientation if horizontally oriented devices are desired.

FIGS. 15a-15d illustrate two gang sleeve 81 with corresponding features to the one gang version shown in FIGS. 13a-13d. Recess 107 provides a space for pull 83 to pass though as sleeve 81 is inserted. FIGS. 16a-16e illustrate the two gang collar 79. Pull 83 can hang out of the way of the cutting tool to permit cutting around interior perimeter flange 89 without obstruction. Pull 83 has sewn hem 111 that acts as a stop as it passes through hole 109 in collar 79.

Figure 17A:
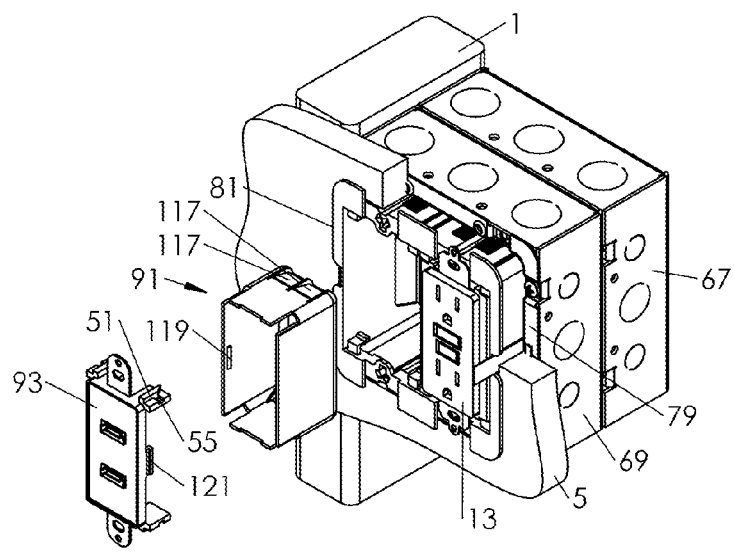
FIG. 17a is an exploded perspective view of a line voltage device and low voltage device installation.
Figure 17B:
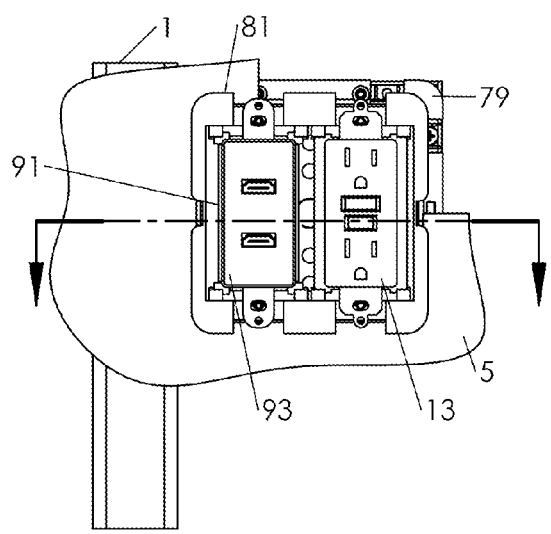
Figure 17C:
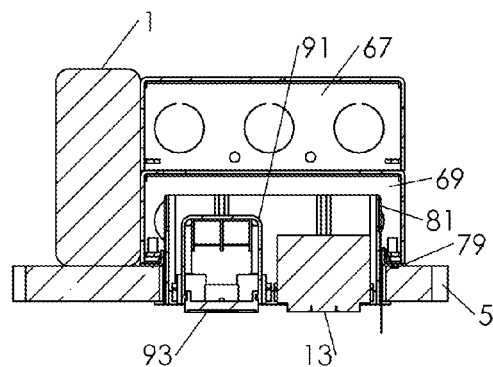
FIG. 17c is a section view taken from FIG. 17b.
Figure 18A:
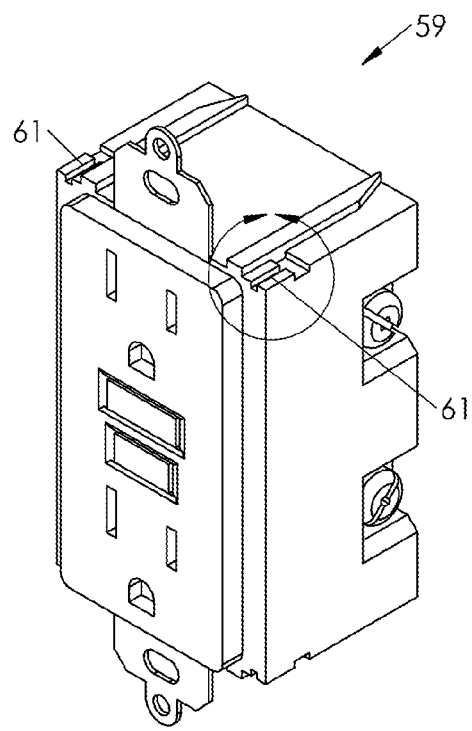
FIGS. 18a-18d are various detail views of the snap-in electrical device of FIGS. 17a-17c.
Figure 18B:
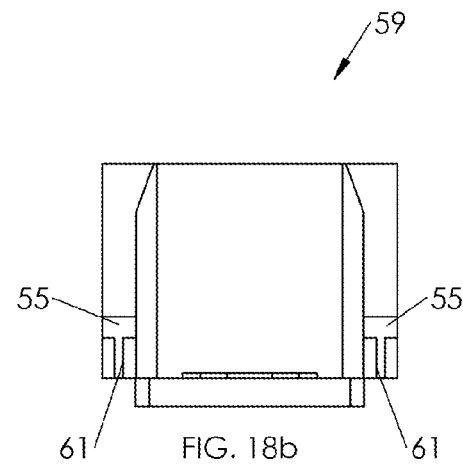
Figure 18C:
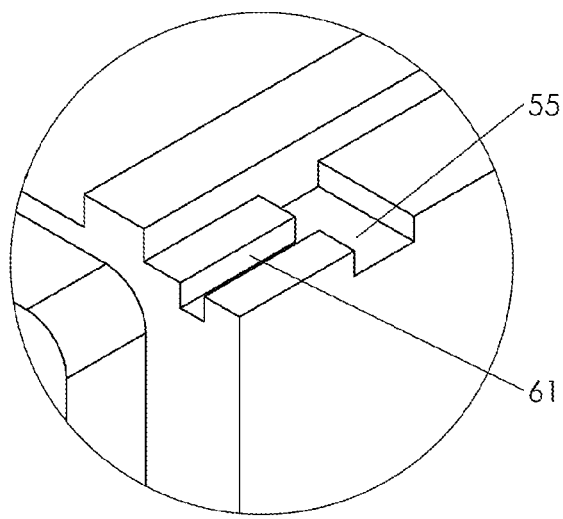
Figure 18D:
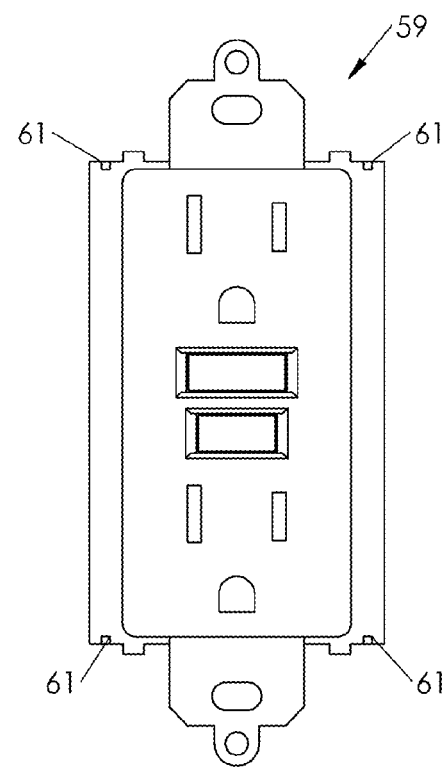
Figure 19C:
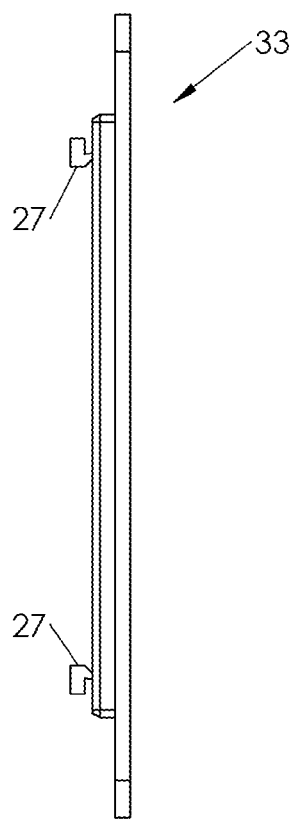
Figure 19D:
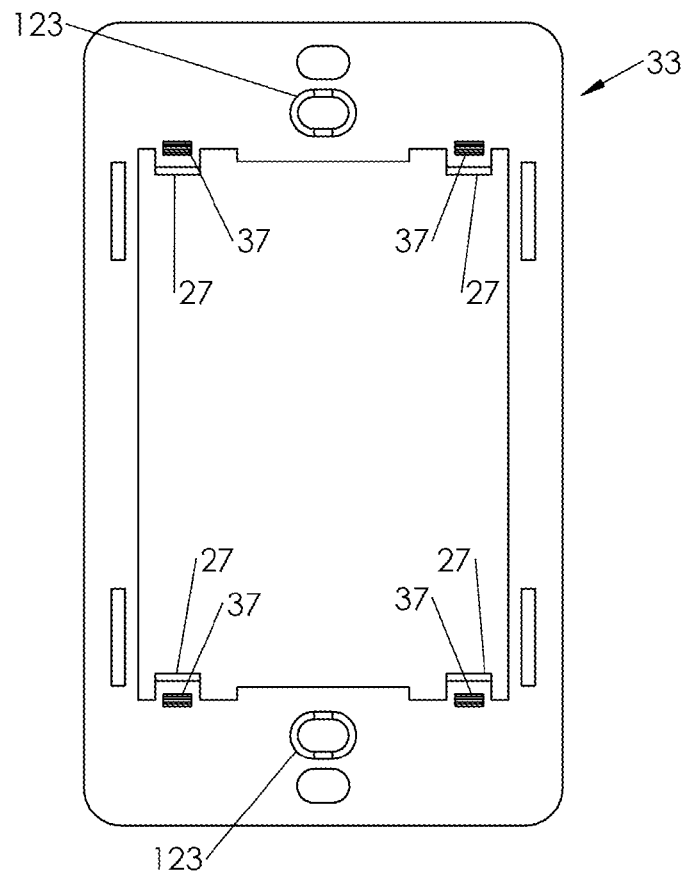
Figure 19E:
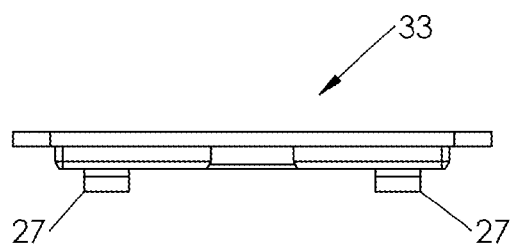

FIGS. 17a-17c illustrate an installation that accommodates mounting of low voltage device 93 and line voltage device 13 in the same sleeve 81, collar 79, and box assembly. Low voltage device 93 includes isolation box 91 that ensures that the differing voltage wire connections, not shown, are isolated. isolation box 91 comprises resilient wire strain relief ports 117 on the top and bottom. Side recesses 119 receive barbed retainers 121 of low voltage device 93. This embodiment alleviates the need to install a dividing plate between differing voltage devices. Low voltage device 93 has snap-in features similar to those on the device in FIGS. 5a-5d, such as ribs 51 and recesses 55. Although this embodiment is shown with novel sleeve 81 and collar 79, isolation box 91 can be used on a suitable low voltage device in a conventional multigang electrical box installation.

Electrical device 59 of FIGS. 18a-18d is provided with an alternate means of removal from retainers 27 on flush flange 6 or sleeve 81. Slots 61 on device 59 can receive a slender tool, such as a screw driver or the like, to flex retainers 27 outward and disengage them from recesses 55 on device 59.

FIGS. 19a-19e illustrate a modification of flange 6 of FIGS. 3a-3e. Flange 33 comprises an alternate device removal feature. Four removal access holes 37 on flange 33 provide access to hole 39 on the outboard side of sprung retainer 27. A screwdriver or the like can be inserted through hole 37 to hole 39 and used to pry sprung retainer from device recesses 55, thereby allowing device 13 to be removed. Countersunk slots 123 allow flush flange 33 to be mounted and adjusted angularly on the box.

Figure 20A:
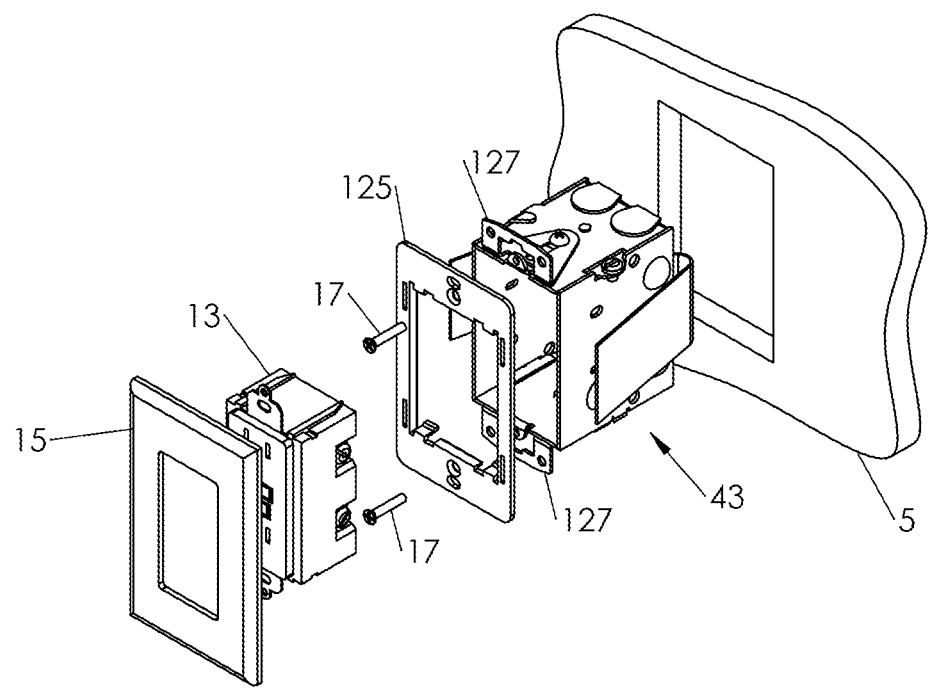
FIGS. 20a-20b are exploded and assembled perspective views, respectively, of the embodiment of FIG. 1 employable in an existing wall.
Figure 20B:
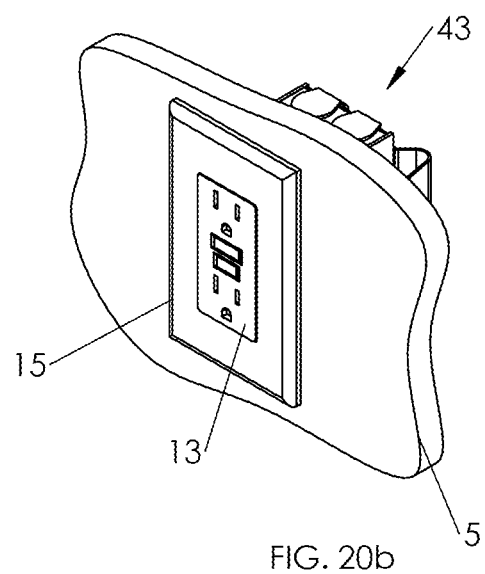

FIGS. 20a-20b illustrate application of the concepts of this disclosure to installation of the embodiment of FIGS. 4a-4e in a pre-existing wall. Conventional rework box 43 can be coupled to flange 125 to facilitate snap-in of the device 13 and cover plate 15. Perimeter ribs 35 on the top and bottom of the flange 125 have been shortened to accommodate rework box ears 127 on the front side of drywall 5.

Figure 21A:
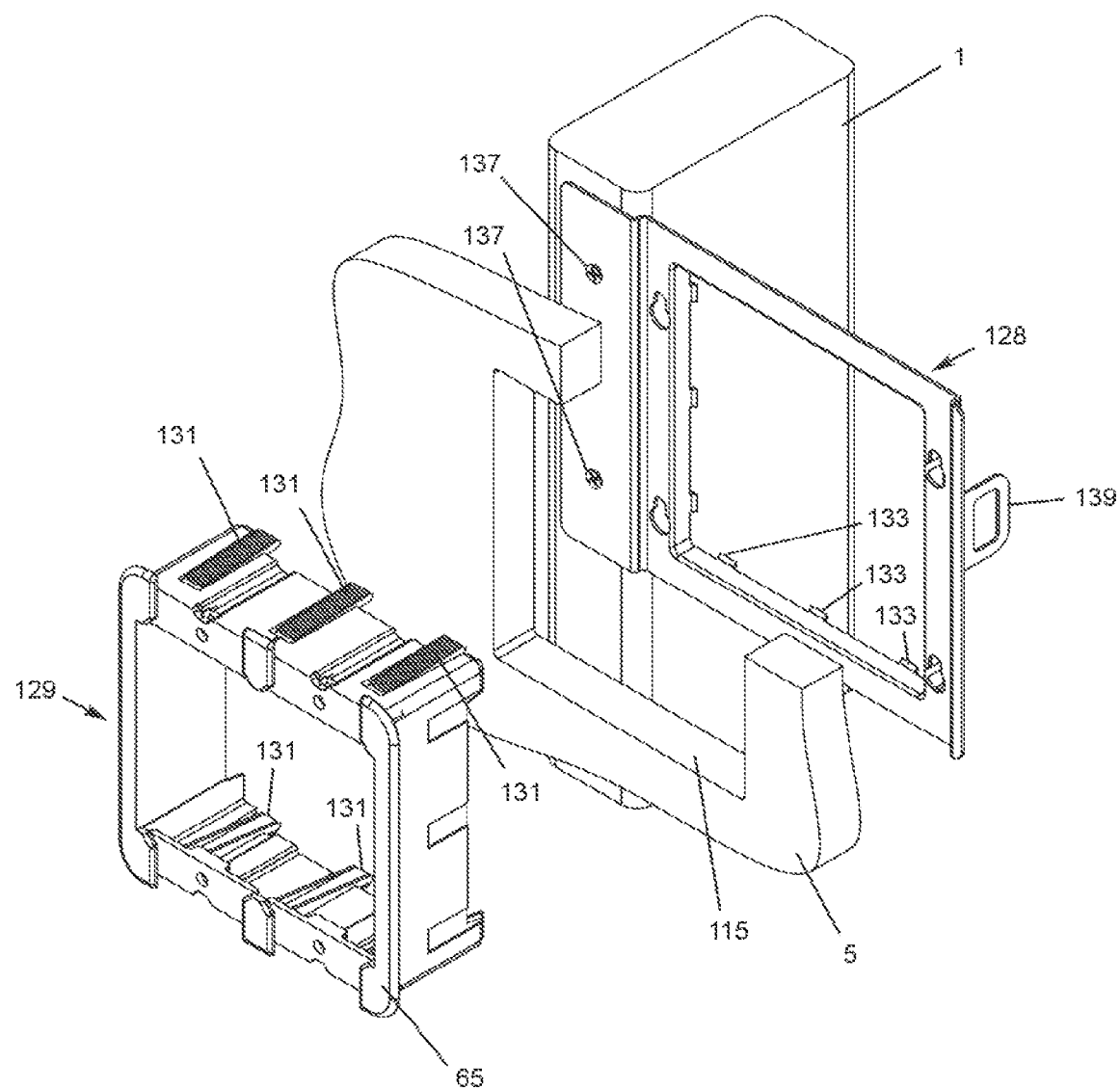
FIGS. 21a-21g exemplify an embodiment illustrating a stud mounted bracket behind drywall with a matching sleeve for installation of low voltage devices.

As shown in FIG. 21a, bracket 128 can be mounted to wall stud 1 with fasteners 137. Thereafter, drywall 5 can be installed to the wall studs. Opening 115 in drywall 5 can then be cut as described in more detail below with respect to FIGS. 28a-28d. Bracket 128 and sleeve 129 are sized to accommodate a plurality of low voltage devices. Although any number of devices may be utilized, for purposes of illustration, a two gang bracket 128 and sleeve 129 are exemplified. Sleeve 129 can be pushed through wall opening 115 and bracket 128 until sleeve flange 65 contacts drywall 5. Resilient cantilevered teeth 131 on sleeve 129 slide within bracket 128 to engage horizontal barbed retainers 133 integral with the bracket at the top and bottom thereof to secure sleeve 129 in position as illustrated in the detail view of FIG. 21e. Rung 139 allows an installer to insert a hand or tool to restrain bracket 128 while sleeve 129 is being pushed into position.

Figure 21B:
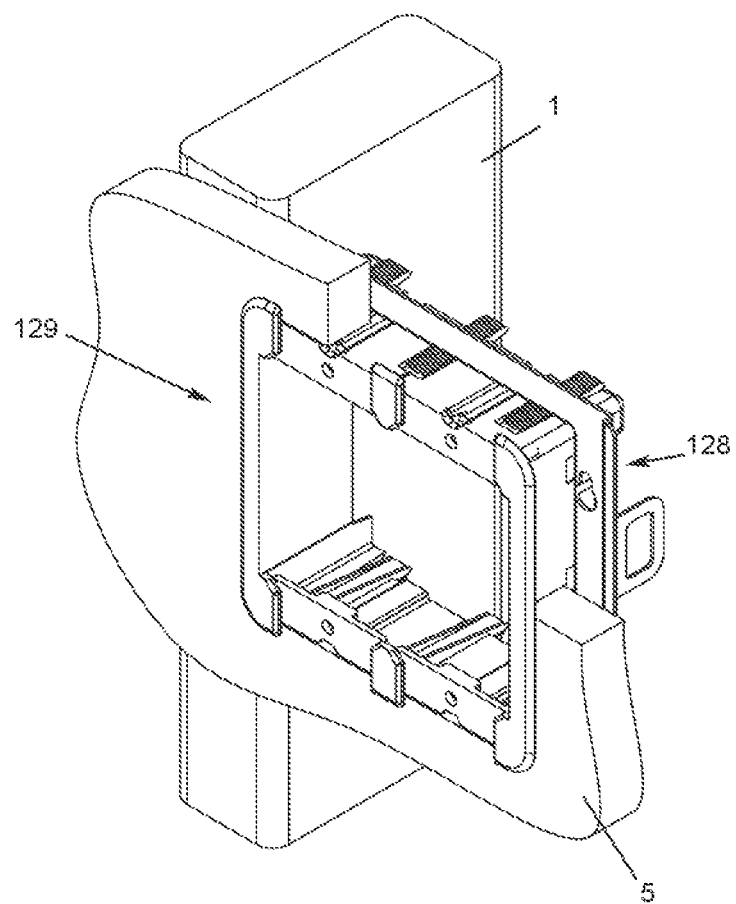
Figure 21C:
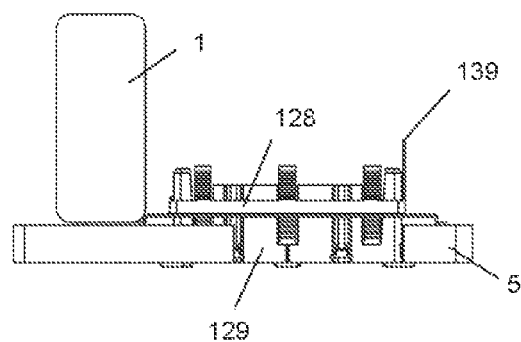
Figure 21D:
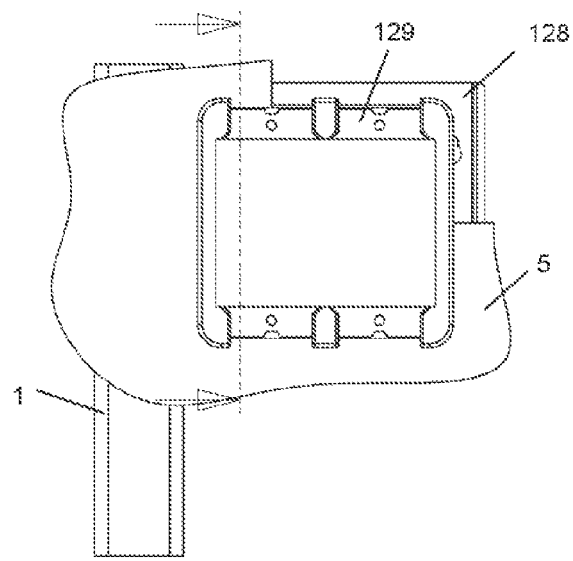
Figure 21E:
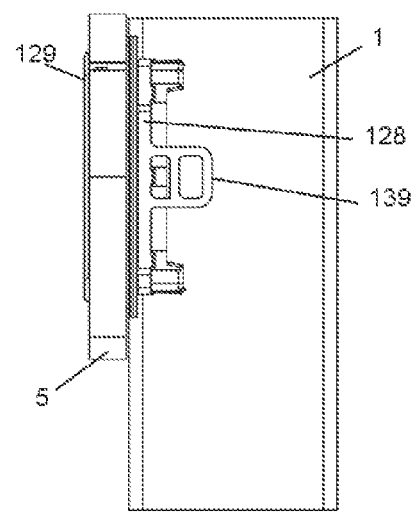
Figure 21F:
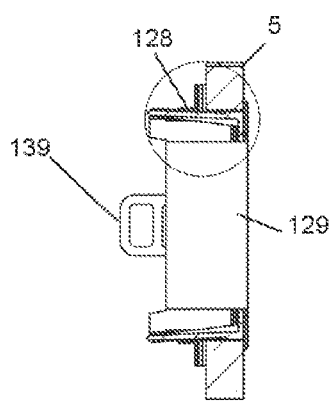
Figure 21G:
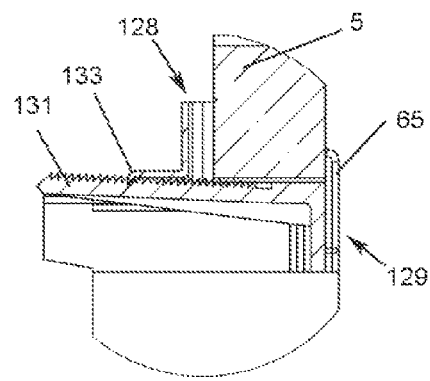

The assembled arrangement is shown in FIGS. 21b-21d. In the illustrated arrangement, two low voltage devices may be retained in vertical orientation with respect to the wall. The length of resilient cantilevered teeth 133 may be dimensioned to accommodate any wall substrate thickness. Sleeve 129 can be removed by hand by flexing the resilient cantilevered teeth away from barbed retainers 133.

Figure 22A:
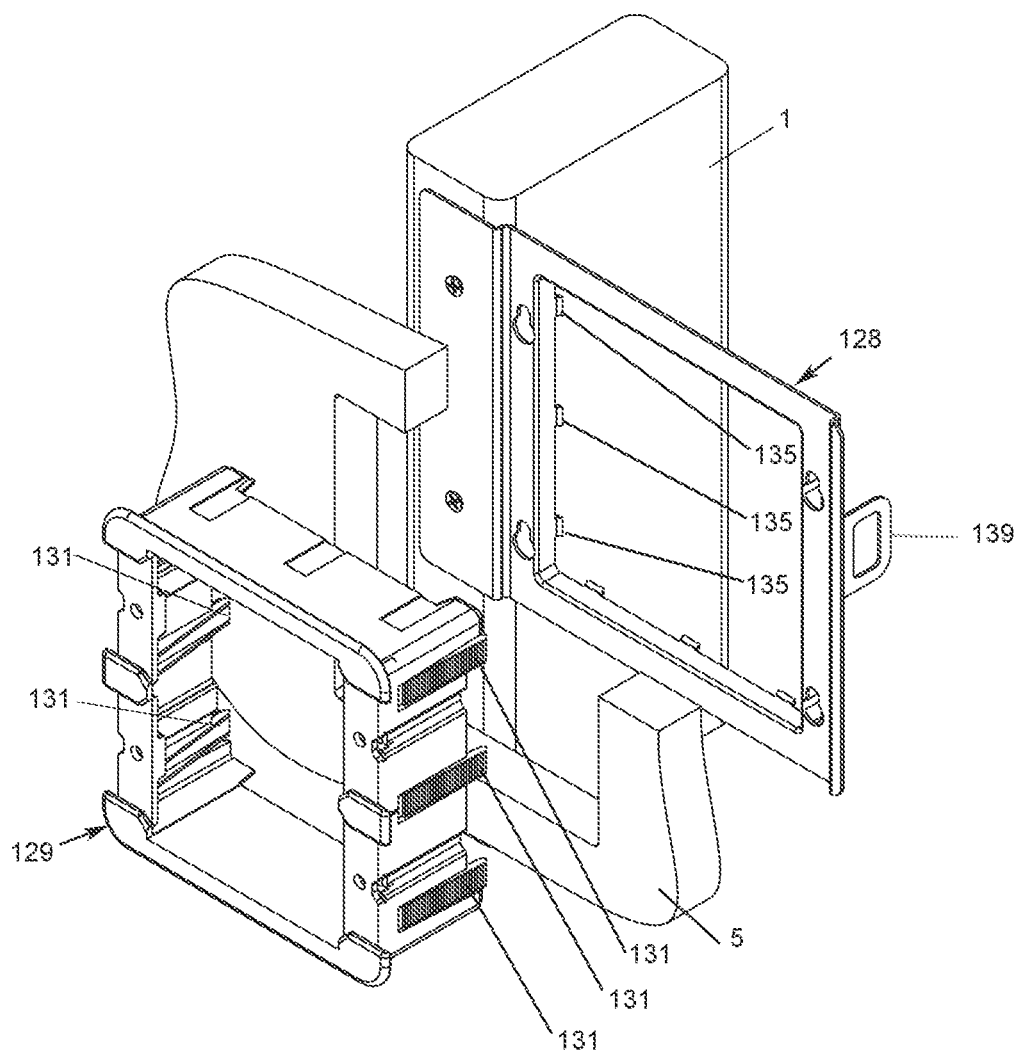
FIGS. 22a-22b illustrate the embodiment of FIG. 21a-21g, oriented for horizontal device installation.
Figure 22B:
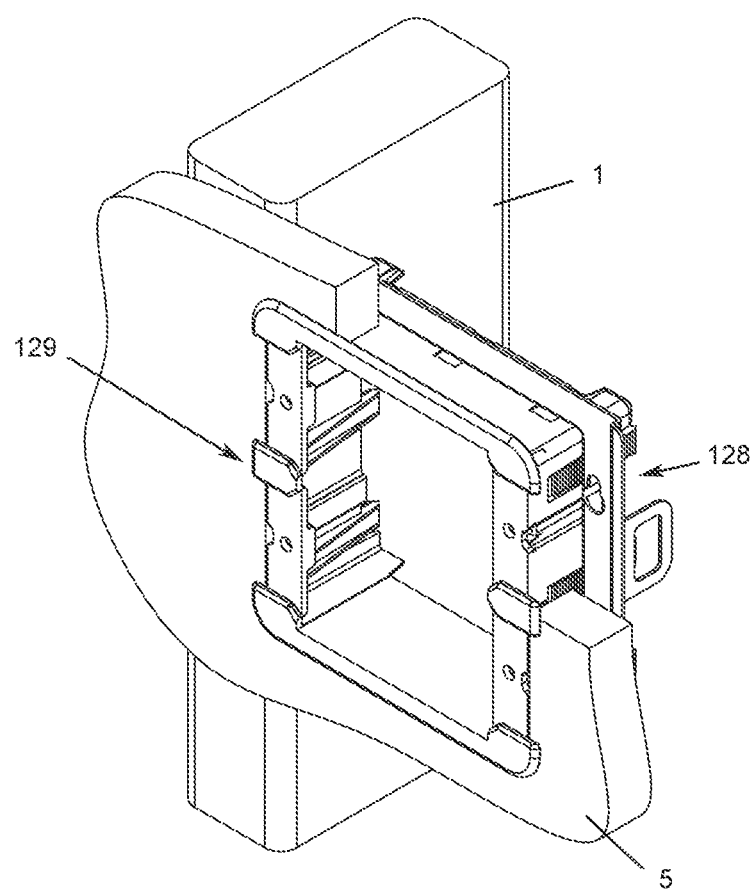

FIGS. 22a-22b exemplify bracket 128 mounted in the same manner as shown in FIGS. 21a-21g while sleeve 129 has been rotated 180 degrees to allow horizontal orientation of electrical devices. Resilient cantilevered teeth 131 slide beneath and engage vertical barbed retainers 135 on either side of bracket 128.

Figure 23A:
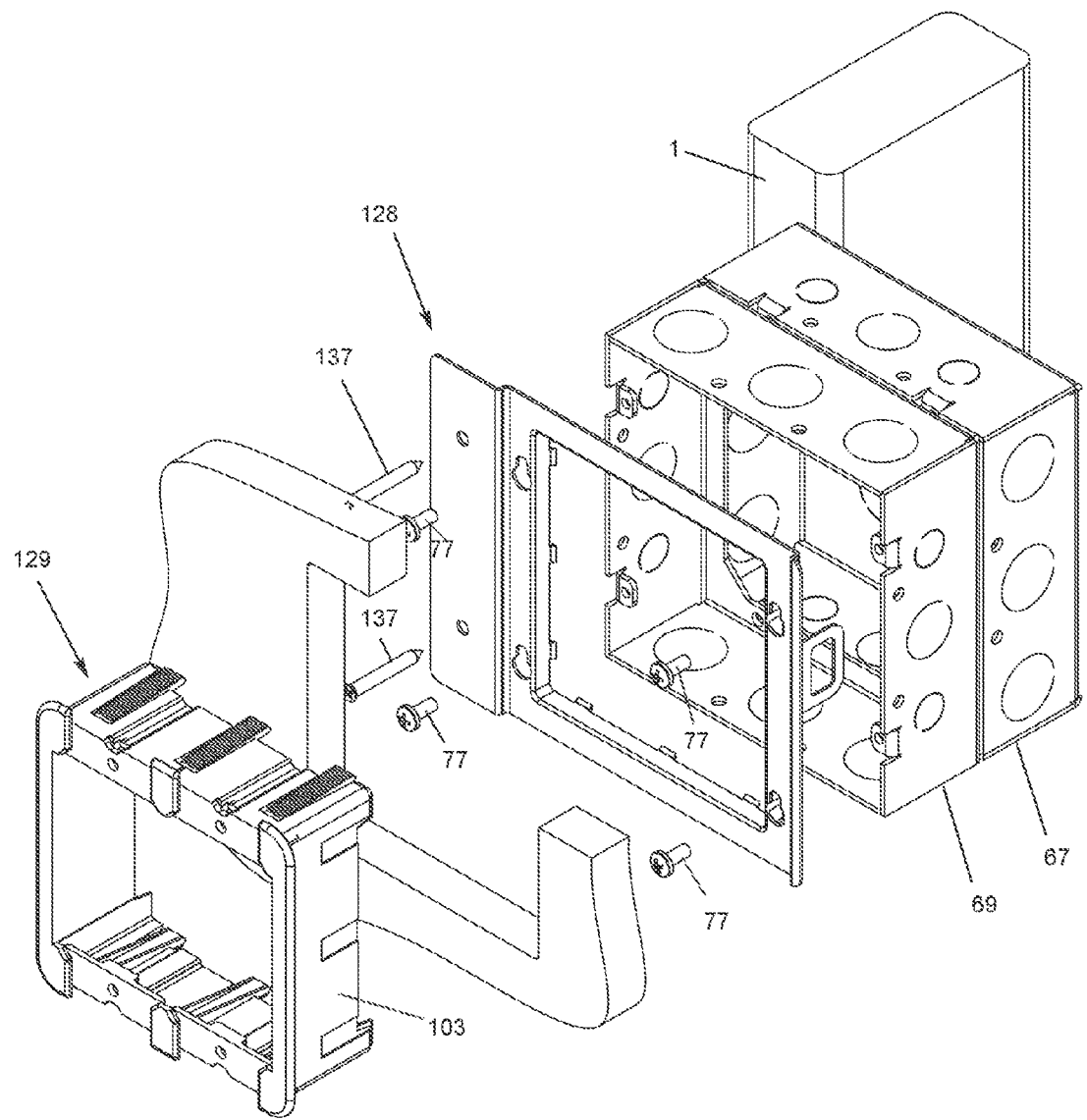
FIGS. 23a-23b illustrate the embodiment of FIGS. 22a-21g and FIGS. 22a-22b for use of line voltage devices.
Figure 23B:
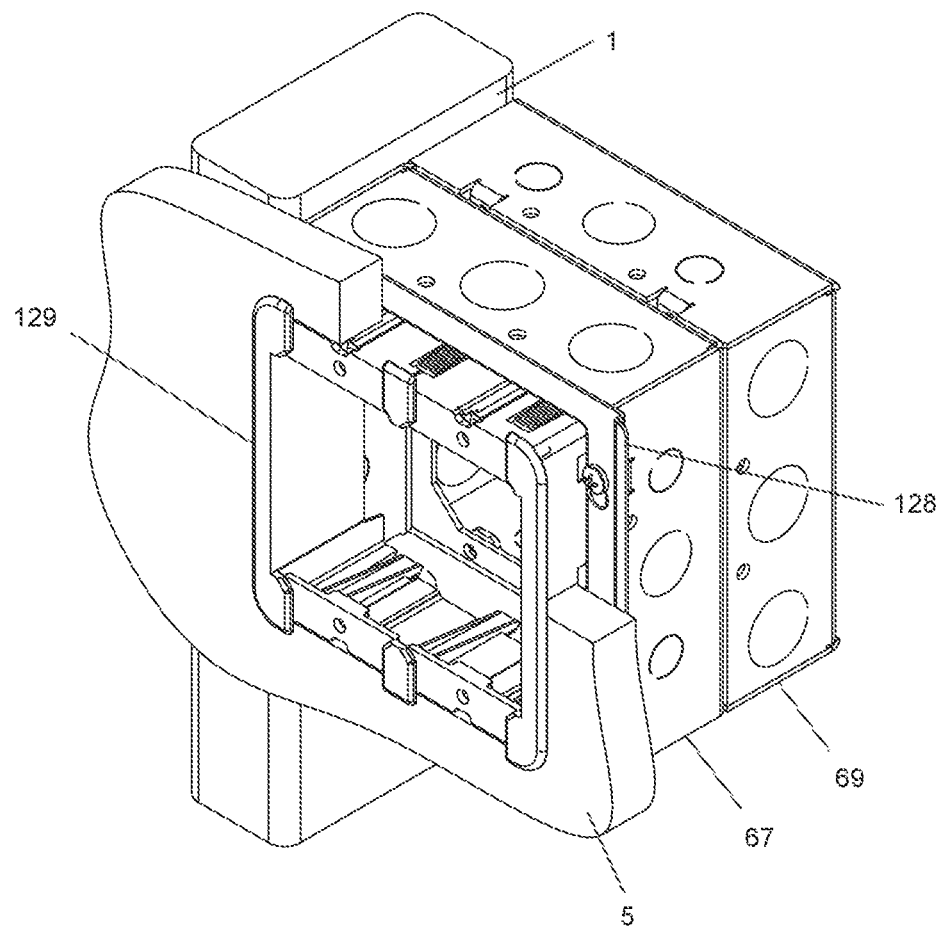
Figure 24A:
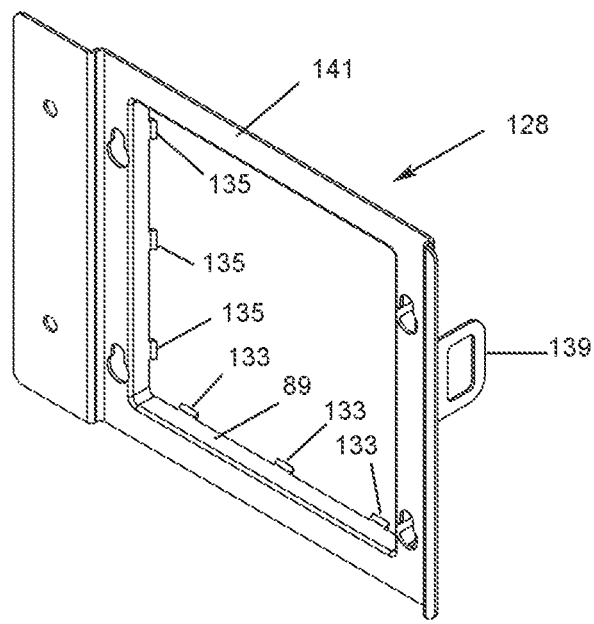
FIGS. 24a-24b are front and rear isometric views, respectively, of the bracket shown in FIGS. 21a-23b.
Figure 24B:
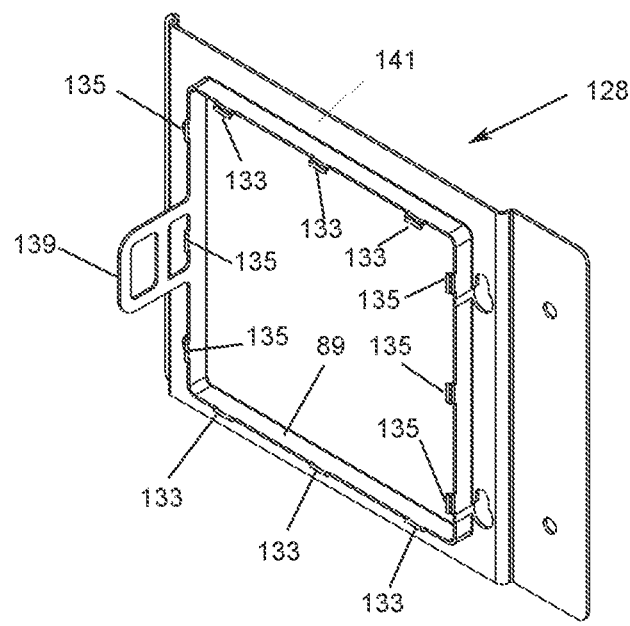
Figure 24C:
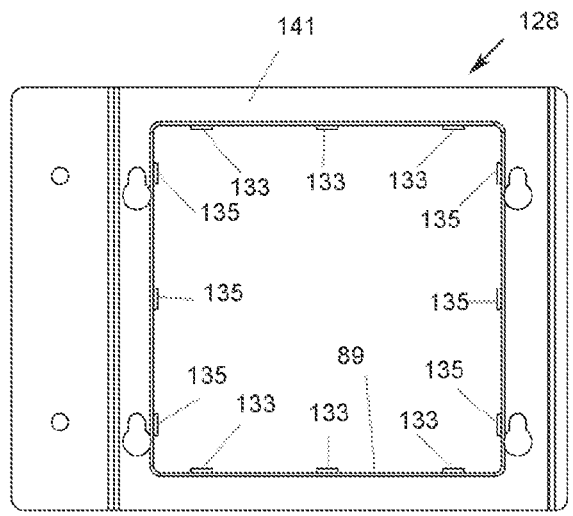
FIGS. 24c-24e are front, side and bottom views, respectively, of the bracket shown in FIGS. 21a-23b.
Figure 24D:
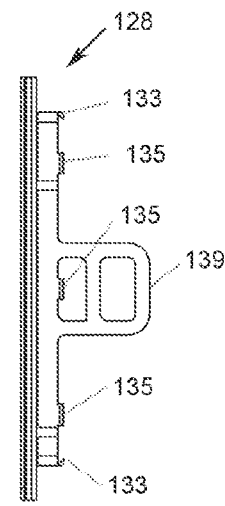
Figure 24E:
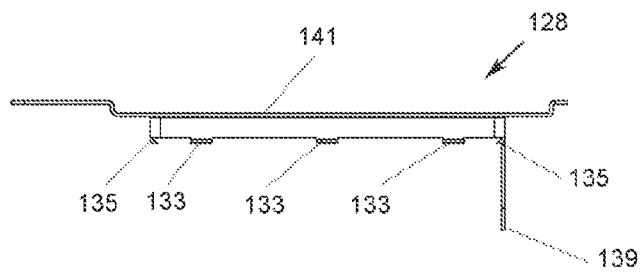
Figure 26A:
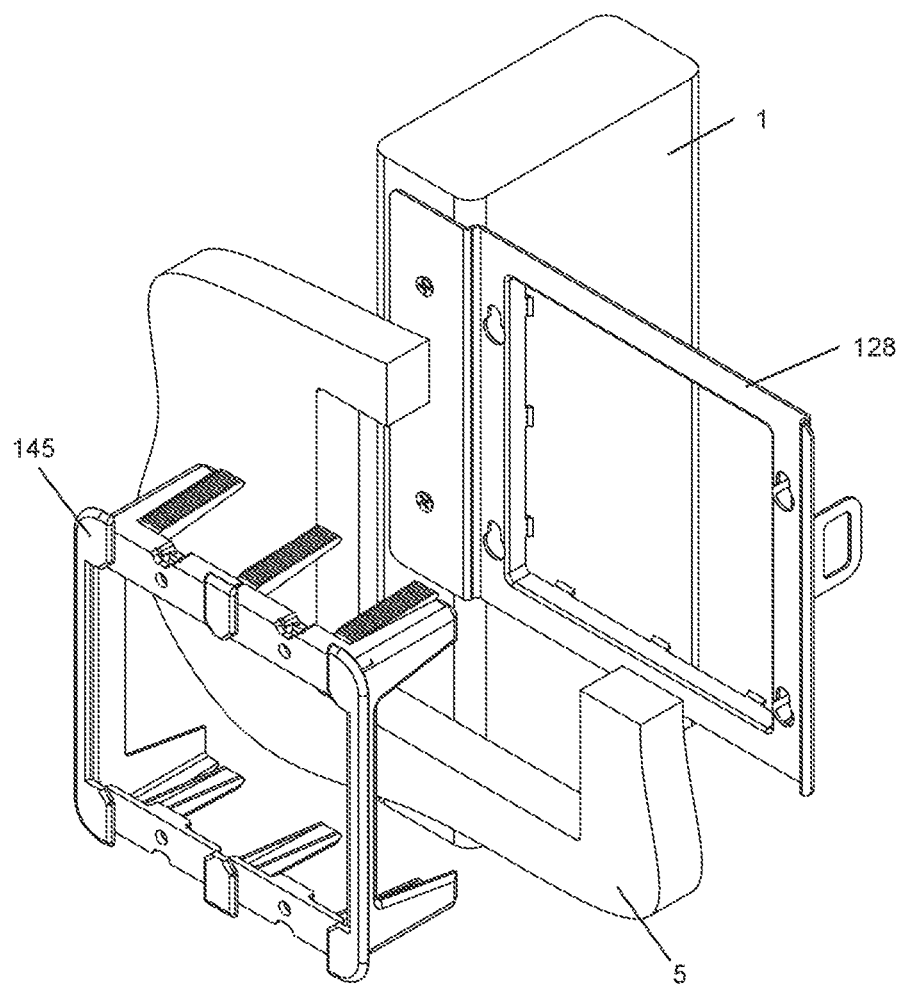
FIGS. 26a-26g exemplify an alternative embodiment for low voltage device installation.
Figure 26B:
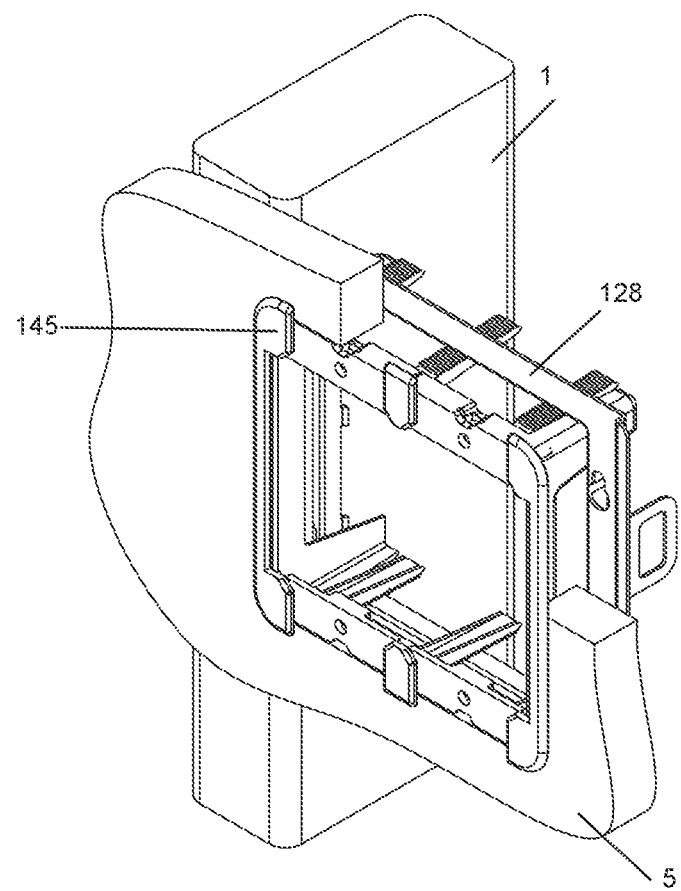
Figure 26C:
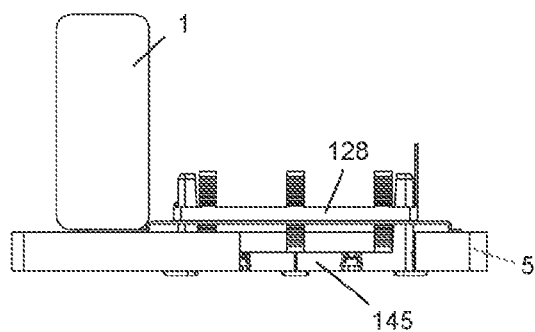
Figure 26D:
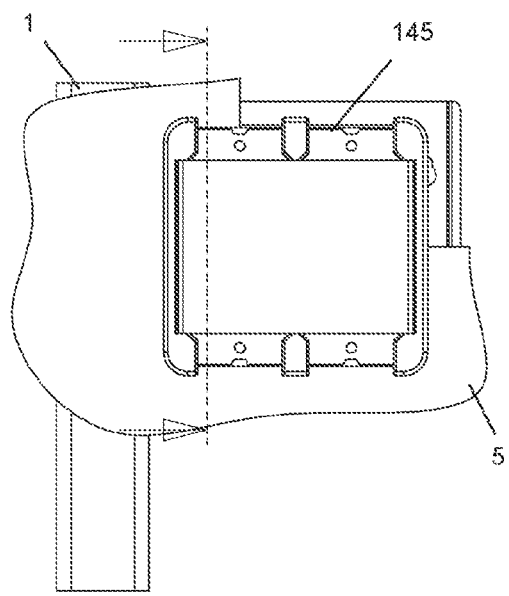
Figure 26E:
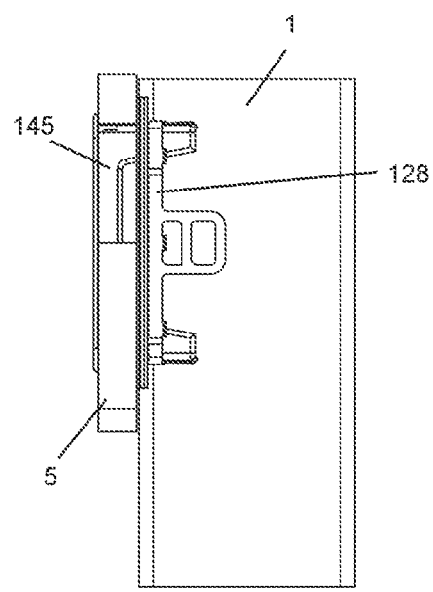
Figure 26F:
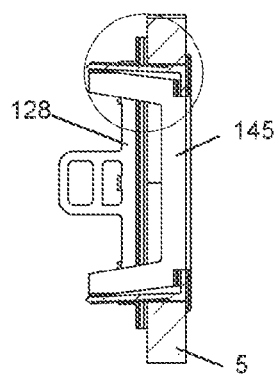
Figure 26G:
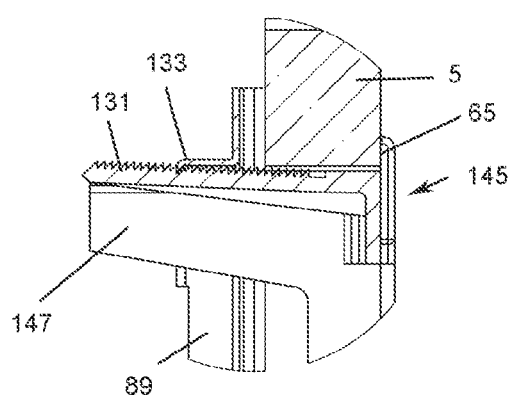
Figure 27A:
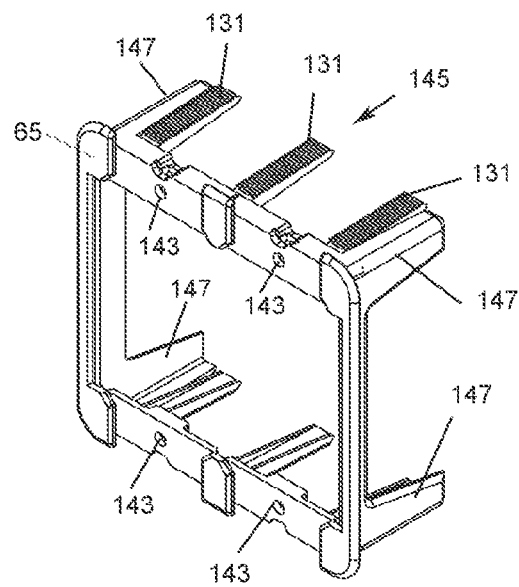
FIG. 27a is a isometric view of the alternative sleeve of the embodiment of FIGS. 26a-26g.
Figure 27B:
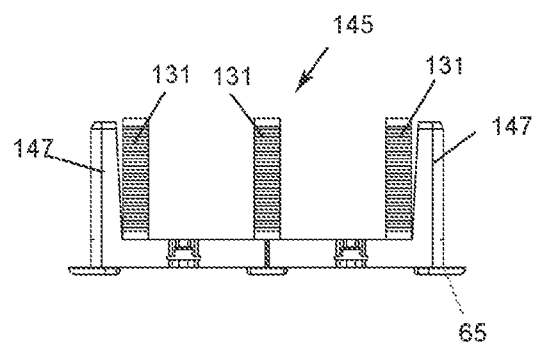
FIGS. 27b-27d are top, side and front views of the alternative sleeve.
Figure 27C:
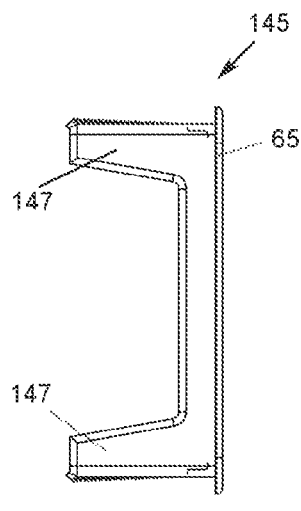
Figure 27D:
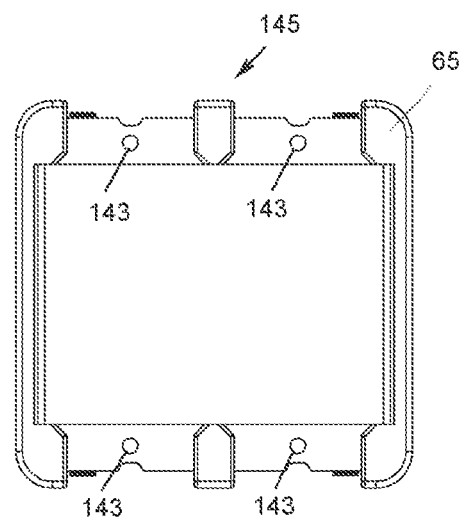

FIGS. 23a-23b show bracket 128 and sleeve 129 in combination with a conventional electrical box for accommodating line voltage devices. Box 67 and extension 69 can be fixed to bracket 128 by fasteners 77, the combination then mounted to stud 1 with fasteners 137. As box 67, extension 69 and perimeter wall 103 on sleeve 129 form an enclosure through the thickness of drywall 5, the installation is suitable for line voltage devices as required by electrical code.

FIGS. 24a-24e are more detailed illustrations of bracket 128. When bracket 128 is mounted to the wall stud, planar element 141 is recessed from the edge surface of the stud. Internal perimeter flange 89 extends rearwardly from planar element 141. Horizontal barbed retainers 133 and vertical barbed retainers 135 extend inwardly from internal perimeter flange 89. Rung 139 projects from the non-stud side of bracket 128.

FIGS. 25a-25d are more detailed illustrations of sleeve 129. Sleeve 129 is suitable for both low and line voltage device installations. Sleeve 129 comprises perimeter wall 103, front flange 65 and resilient cantilevered teeth 131. Holes 143 are provided for reception of device mounting screws. As shown in FIGS. 21a-23b, sleeve 129 is suitable for use in both low voltage device installations and line voltage device installations.

FIGS. 26a-26d exemplify an alternative assembly embodiment. The assembly differs from that of FIGS. 21a-25d with respect to low voltage sleeve 145. As seen in FIGS. 27a-27d sleeve 145 does not have a perimeter wall that would allow it to be used for line voltage device installation. Angle corner elements 147 align sleeve 145 vertically and horizontally within the internal perimeter 89 at the wall. Resilient cantilevered teeth 131 are retained by barbed retainer 133 of bracket 128.

Figure 28A:
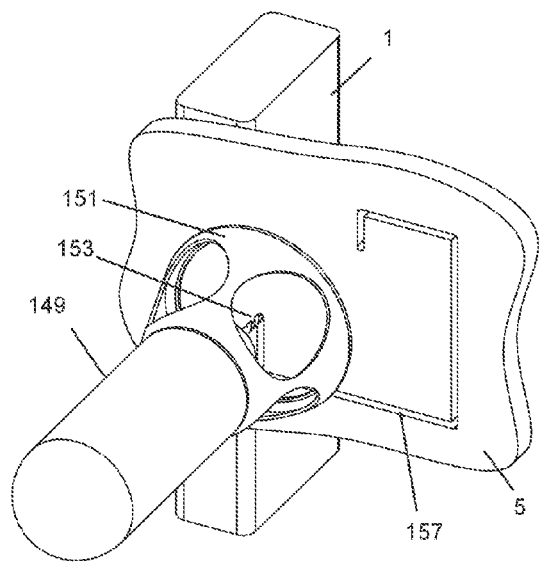
FIGS. 28a-28d illustrate use of a rotary cutting tool running along an internal perimeter flange of the bracket of FIGS. 26a-26g for cutting an opening in a wall substrate.
Figure 28B:
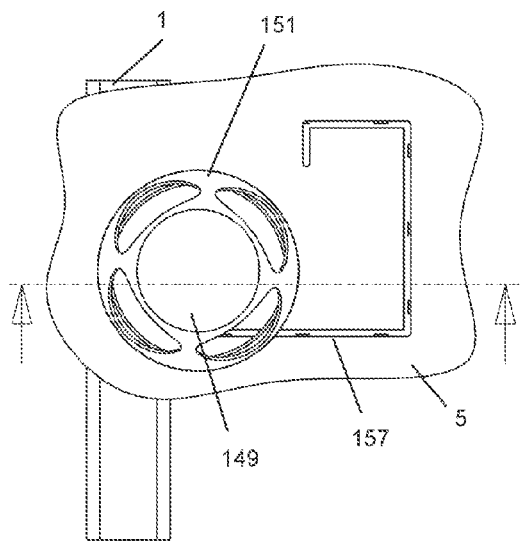
Figure 28C:
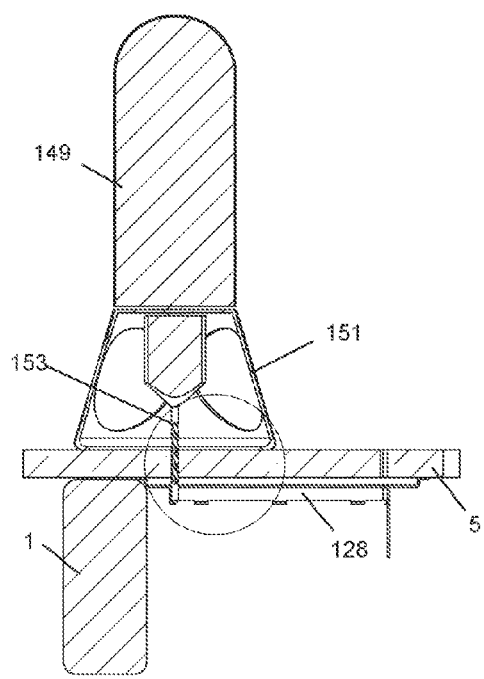
Figure 28D:
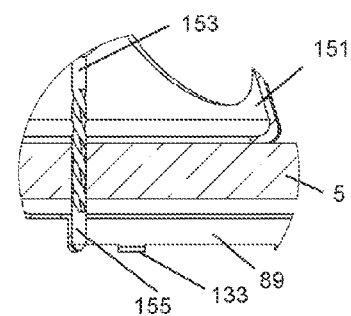

The means of cutting the hole in the drywall 5 is shown in FIGS. 28a-28d illustrate a manner in which an installed bracket may be used to form the opening in the drywall 5. Rotating cutting tool 149 comprises cutting bit 153 and depth guide 151. Cutting bit 153 contains cutting flutes along its length except at guide tip 155. To form the opening, an access hole for cutting bit 153 may be drilled at any point within the inner periphery of the bracket, as illustrated in FIGS. 28a and 28b. After insertion of cutting bit 153, during cutting operation, guide tip 155 runs along internal perimeter flange 89 to define cutting path 157 in drywall 5. Depth guide 151 maintains the depth of cutting bit 153 through drywall 5 to ensure that guide tip 155 runs along internal perimeter flange and to maintain its height appropriate to avoid cutting barbed retainers 133 of bracket 128.

Figure 29A:
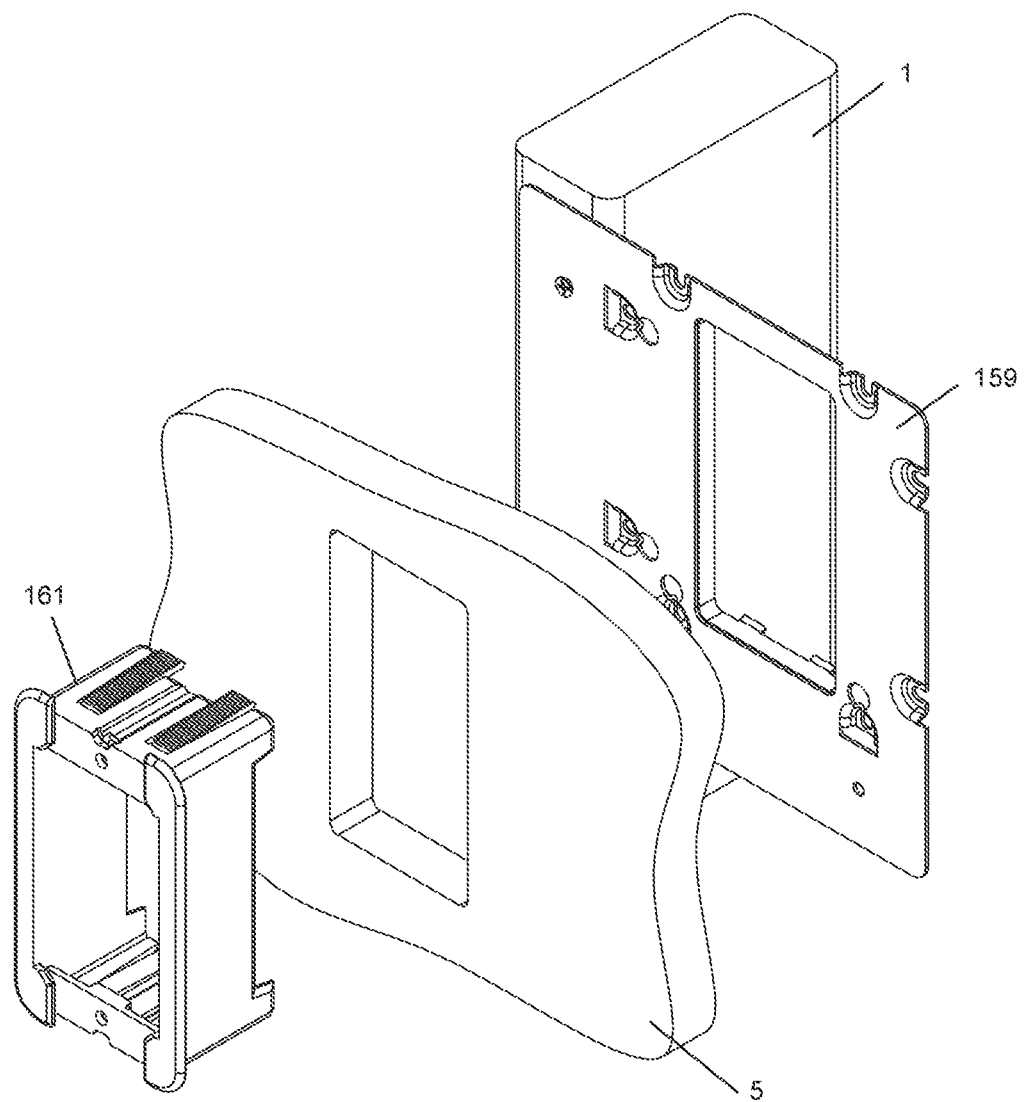
FIG. 29a is an exploded isometric view of a single gang installation corresponding to that shown in FIGS. 21a-21g.
Figure 29B:
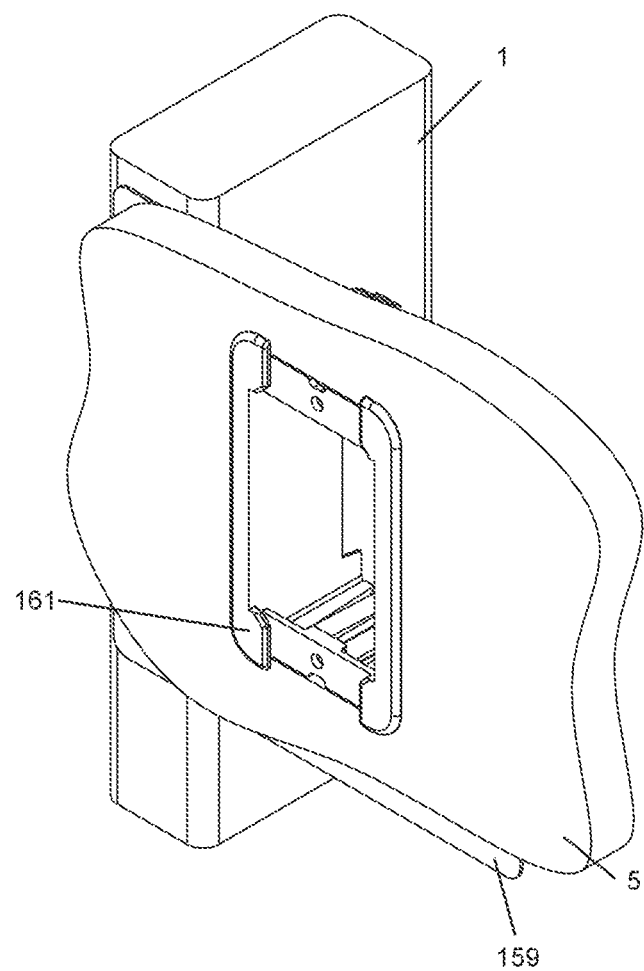
FIG. 29b is an isometric view of the installation shown in FIGS. 21a-21g.
Figure 30A:
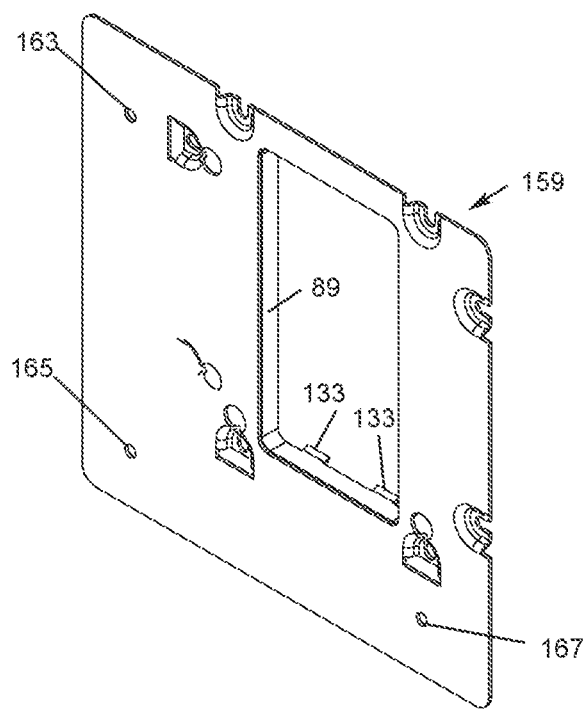
FIGS. 30a-30b are front and rear isometric views of the single gang bracket shown in FIGS. 29a-29b.
Figure 30B:
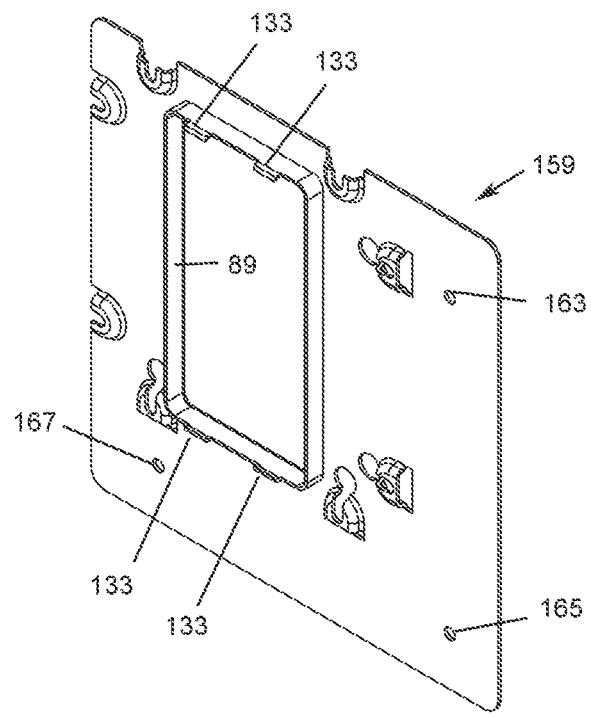
Figure 31A:
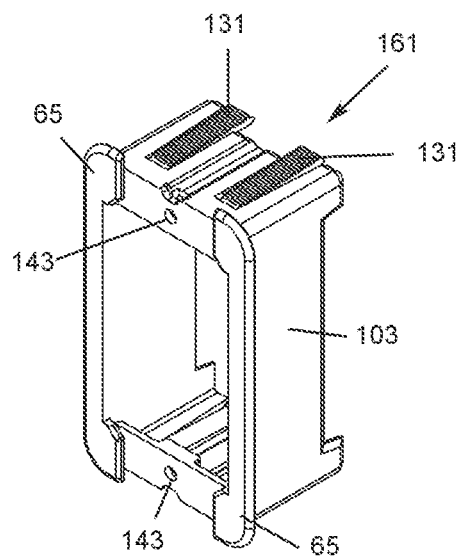
FIG. 31a is a front isometric view of the single gang sleeve used in FIGS. 29a-29b.
Figure 31B:
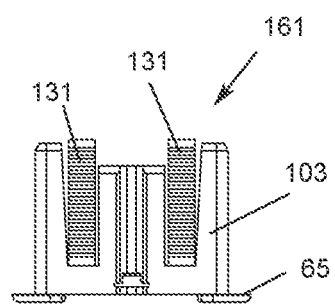
FIGS. 31b-31d are top, side and front views of the single gang sleeve shown in FIGS. 29a-29b.
Figure 31C:
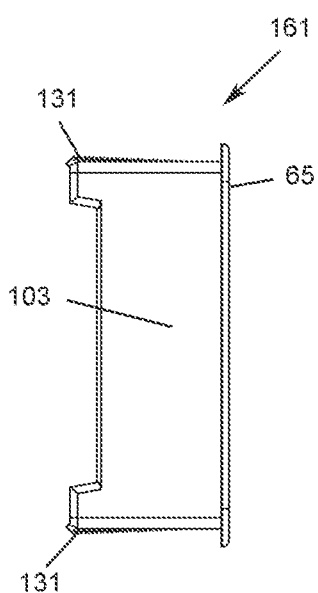
Figure 31D:
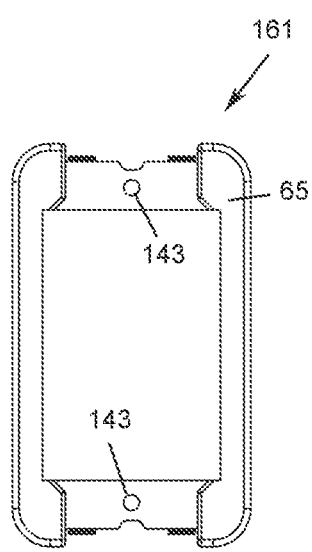
Figure 32A:
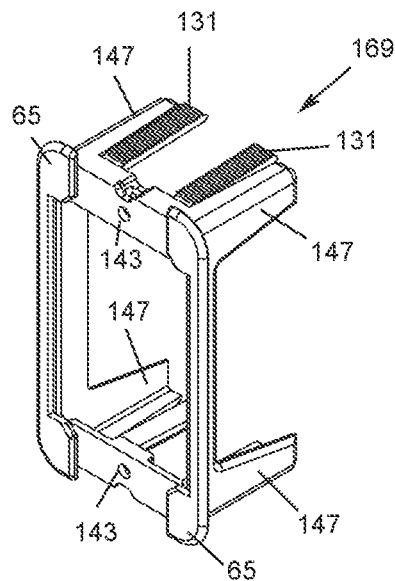
FIG. 32a is a front isometric view of a single gang sleeve embodiment only suitable for low voltage device installation.
Figure 32B:
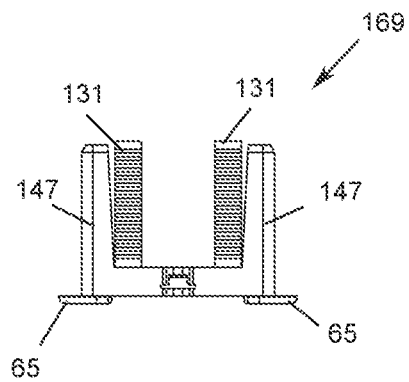
Figure 32C:
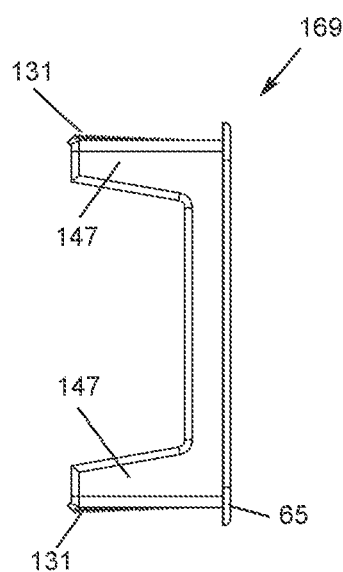
Figure 32D:
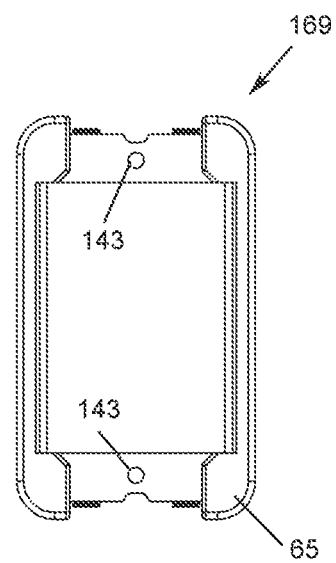
Figure 33A:
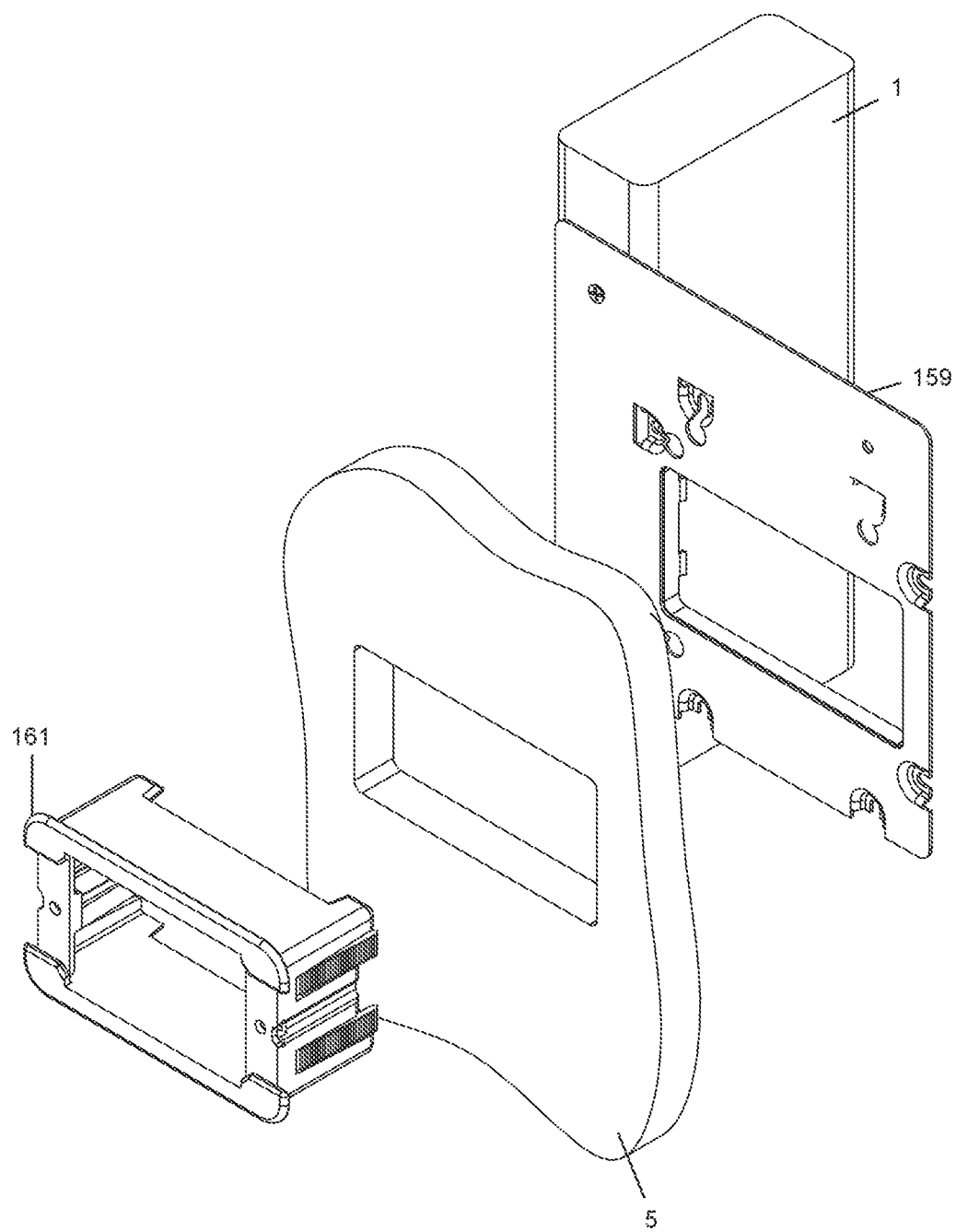
FIG. 33a is an exploded isometric view of the bracket and sleeve shown in FIGS. 29a-29b mounted for horizontal device installation.
Figure 33B:
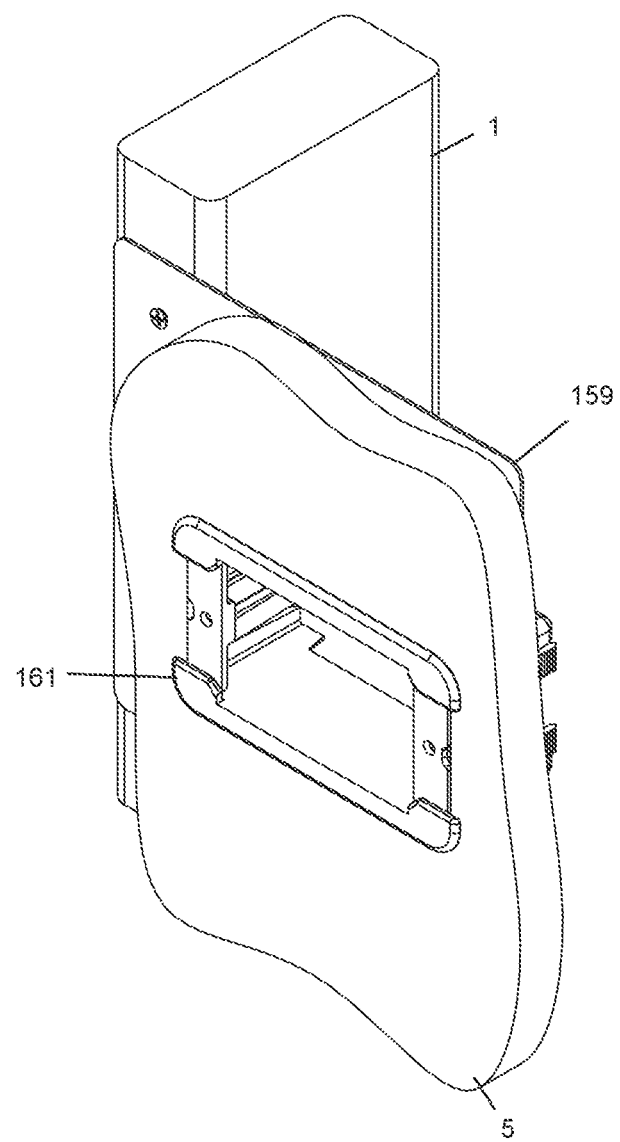
FIG. 33b is an isometric view of the bracket and sleeve shown in FIGS. 29a-29b mounted for horizontal device installation.

FIGS. 29a-29b illustrate a low voltage assembly corresponding to the assembly shown in FIGS. 21a-21g. As seen in FIG. 29a, single gang bracket 159 is mounted to stud 1 with single gang sleeve 161 inserted into bracket 159 through drywall 5. Single gang bracket 159 is shown in more detail in FIGS. 30a-30e. Flange 89 extends continuously at the inner perimeter of bracket 159. Barbed retainers 133 are situated at opposite sides of flange 89. Bracket 159 can be mounted to stud 1 in the vertical orientation via mounting holes 163 and 165. Bracket 159, alternatively, can be mounted in a horizontal orientation via mounting holes 165 and 167.

Figure 34A:
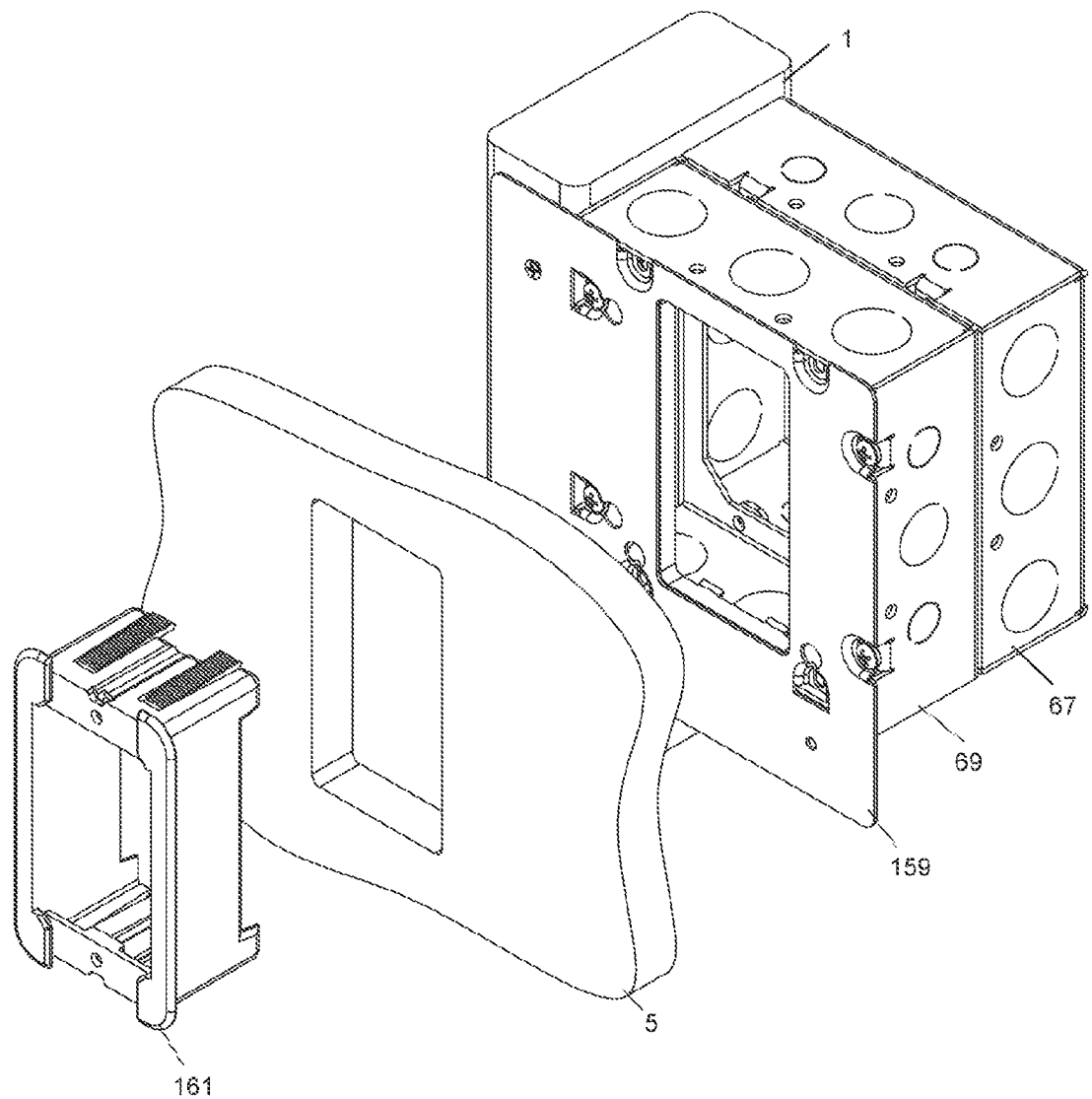
FIG. 34a is an exploded isometric view of the bracket and sleeve shown in FIGS. 29a-29b in combination with an electrical box.
Figure 34B:
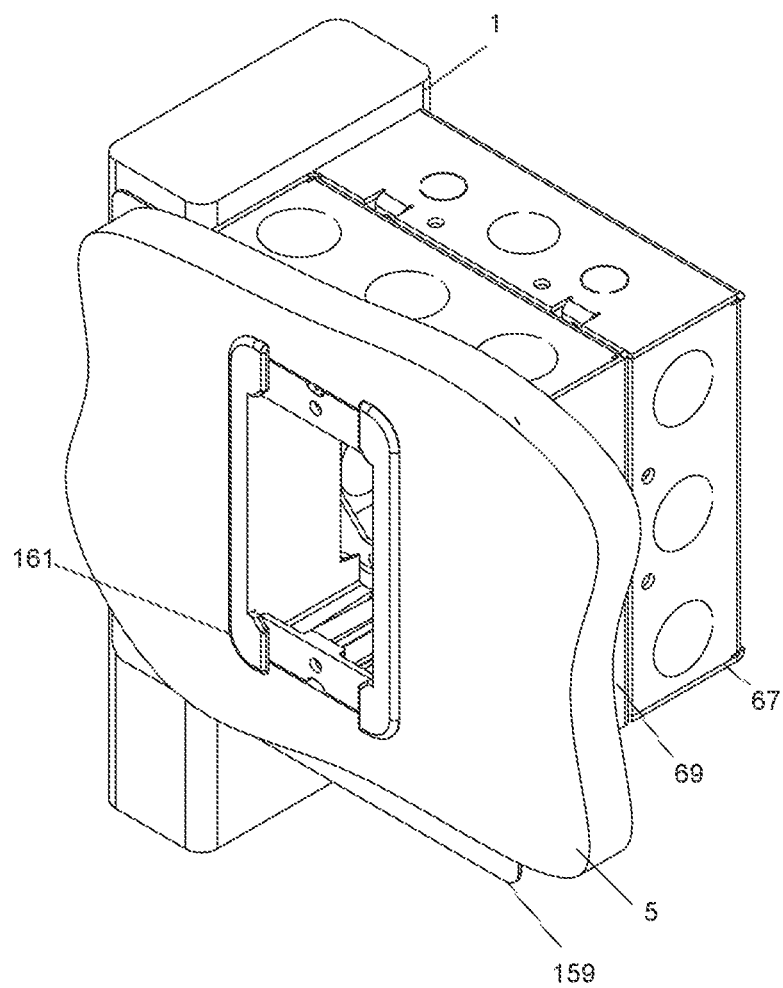

Similar to two gang sleeve 129, Single gang sleeve 161 is shown in more detail in FIGS. 31a-31d. Perimeter wall 103 is configured to accommodate a low voltage device installation or for alternative line voltage device installation in combination with the electrical box 67, shown in FIGS. 34a and 34b. Extension 67 may be added to provide additional box space. Sleeve 161 may be modified as shown in FIGS. 32a-32d for installation of only a low voltage device. Single gang low voltage sleeve 169, lacks perimeter wall 103 of sleeve 161.

Figure 35A:
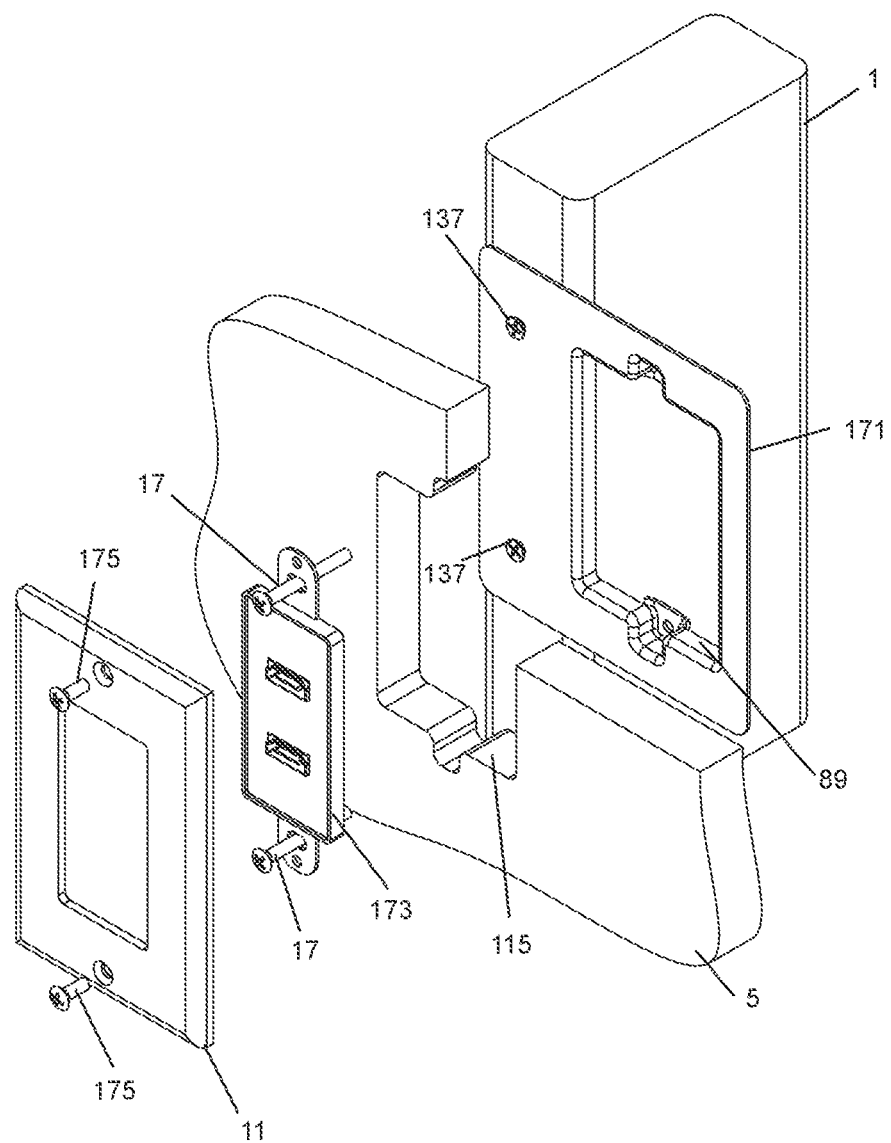
FIG. 35a is an exploded isometric view of a bracket mounted on a stud for installation of a low voltage device.
Figure 35B:
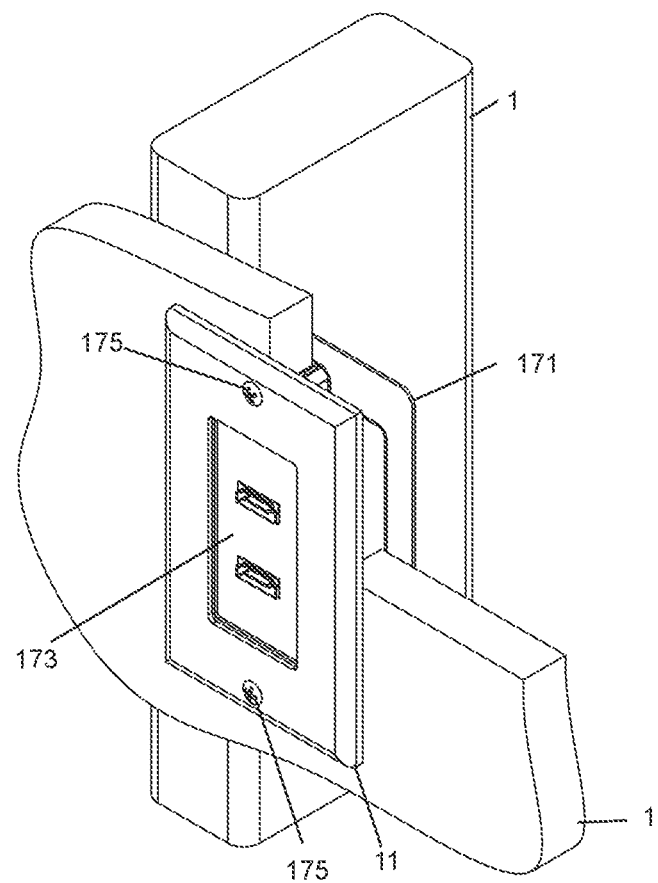
Figure 36A:
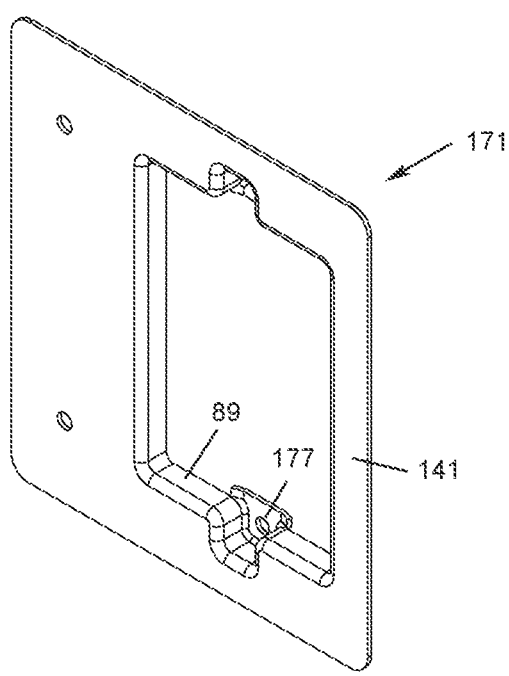
FIGS. 36a-36b are front and rear isometric views, respectively, of the bracket shown in FIGS. 35a-35b.
Figure 36B:
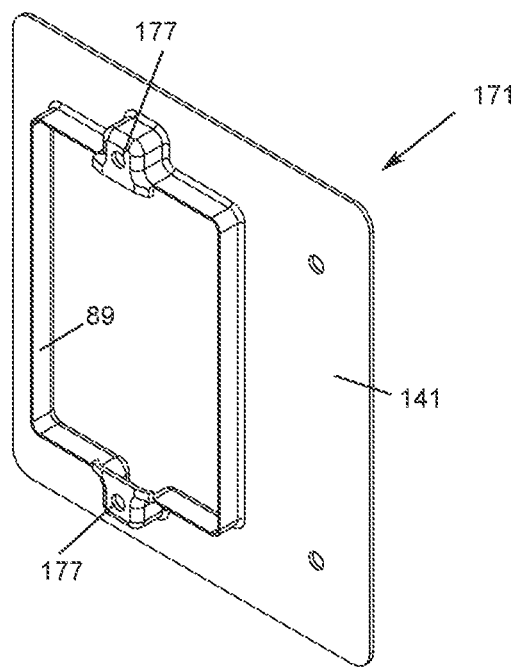
Figure 36C:
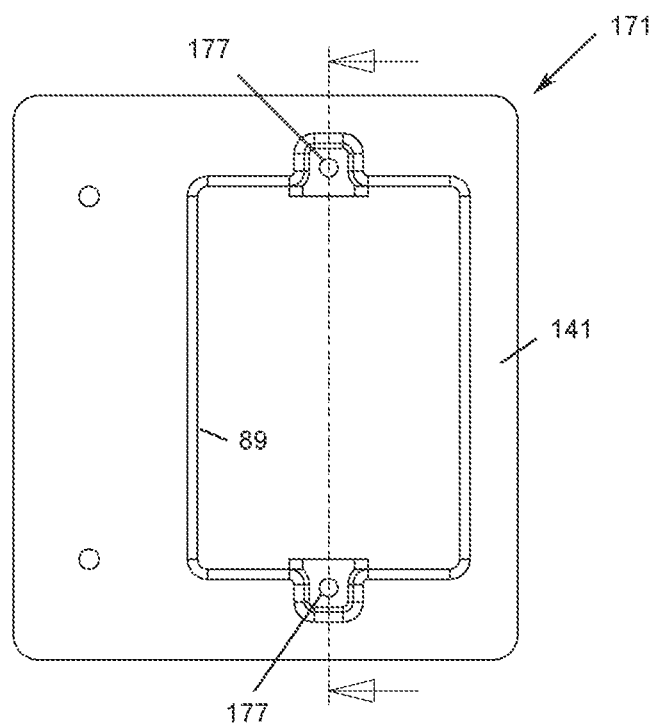
FIG. 36c is a side orthographic view of the bracket shown in FIGS. 35a-35b.
Figure 36D:
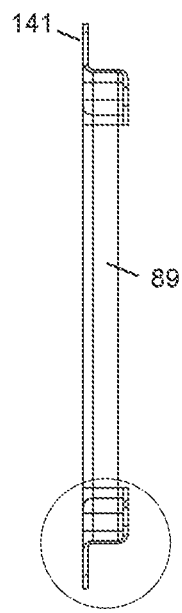
FIG. 36d is a section view taken from FIG. 36c.
Figure 36E:
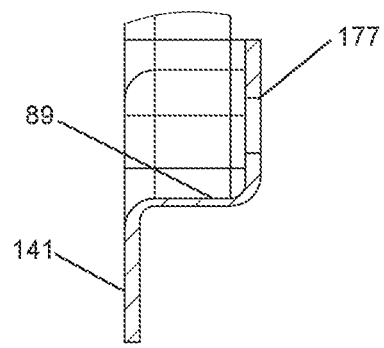
FIG. 36e is a detail view taken from FIG. 36d.

A sleeveless low voltage device installation is shown in FIGS. 35a-35b. Bracket 171 is mounted to stud 1 with fasteners 137. Drywall 5 can then be fixed to stud 1. Hole 115 in drywall 5 can then be cut in similar manner to that described with respect to FIGS. 28a-28d by running the cutting tool along internal perimeter flange 89 that extends rearwardly from planar element 141. Recessed mounting holes 177 in bracket 171, shown in FIGS. 36a-36e, receive fasteners 17. Mounting holes 177 are recessed to allow the cutting tool, running along flange 89, to pass without obstruction and remove drywall from in front of mounting hole. Sufficient drywall is thus left around the mounting hole to provide sufficient surface upon which the device mounting plates can be supported.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, while the electrical device has been exemplified with protruding ribs that can mate with cutouts in the flange to center the device, they instead may contain troughs in its housing to mate with protrusions in the flange.

It should be understood that the term "drywall" as used throughout the disclosure is representative of any wall substrate. The term "low voltage device" is representative not only with respect to communication devices but other electrical devices well known in the art that are operable from direct current sources, for example, LED devices.

Although the disclosure exemplifies installations on wall substrates, the disclosed concepts are applicable to ceiling and floor installations. Similarly, it should be understood that the concepts disclosed herein are applicable to other electrical devices, such as keypads, speakers, display devices, and the like and to supporting other elements or appliance within a building surface.

The concepts of the present disclosure are further applicable to use as blind covers for limiting access to cavities in walls, ceilings and floors. The sleeve may comprise a closed outer surface for this purpose. The blind cover can be hinged or latched to serve as a door.

What is claimed is:

1. An assembly comprising:
    a bracket mountable directly to a wall, the bracket comprising a front surface configured to be flush with an internal surface of a wall substrate, the bracket having an inner periphery defining an opening in the wall substrate, the inner periphery coincident in configuration with the wall substrate opening; and
    a removable sleeve engageable with the bracket and with an external surface of the wall substrate to secure tight contact between the wall substrate and a structure interior of the wall, irrespective of the thickness of the wall substrate; wherein
    the sleeve comprises a resilient element; and
    the bracket further comprises:
    a barbed element configured to retain the resilient element of the sleeve; and
    a planar element recessed from the front surface;
    wherein the planar element comprises said inner periphery, and the bracket further comprises a flange extending from the inner periphery of the planar element in a direction rearward of the front surface.

2. An assembly as recited claim 1, wherein barbed element is fixed to an edge of the flange.

3. An assembly as recited in claim 1, wherein the inner periphery of the bracket comprises a generally rectangular configuration, and the bracket further comprises a plurality of barbed elements fixed to the edge of the flange at opposite sides of the periphery.

4. An assembly as recited in claim 3, wherein the plurality of barbed elements are positioned to engage the sleeve selectively in either of a vertical or horizontal relationship relative to the inner periphery.

5. An assembly as recited in claim 1, wherein the bracket comprises means for mounting to the wall selectively in either of two directions.

6. An assembly as recited in claim 1, wherein the flange further comprises an element extending further in the rearward direction.

* * * * *